(12) United States Patent
Hickey et al.

(10) Patent No.: US 11,945,291 B2
(45) Date of Patent: Apr. 2, 2024

(54) TRUCK CAP

(71) Applicant: Leer Group, Elkhart, IN (US)

(72) Inventors: Jeffrey Joal Hickey, Sturgis, MI (US); Donald Richard Ireland, Middlebury, IN (US); Terrill D. Becker, Bristol, IN (US); Mitchell Austin Westra, Granger, IN (US); James Dillard Fletcher, Elkhart, IN (US)

(73) Assignee: Leer Group, Elkhart, IN (US)

( * ) Notice: Subject to any disclaimer, the term of this patent is extended or adjusted under 35 U.S.C. 154(b) by 0 days.

(21) Appl. No.: 18/196,053

(22) Filed: May 11, 2023

(65) Prior Publication Data
US 2023/0278405 A1   Sep. 7, 2023

Related U.S. Application Data

(63) Continuation of application No. 17/695,165, filed on Mar. 15, 2022, now Pat. No. 11,648,832, which is a
(Continued)

(51) Int. Cl.
*B60J 7/16* (2006.01)
*B60J 5/10* (2006.01)
*B60P 7/02* (2006.01)

(52) U.S. Cl.
CPC ............ *B60J 7/1607* (2013.01); *B60J 5/108* (2013.01); *B60P 7/02* (2013.01)

(58) Field of Classification Search
CPC ... B60J 5/101; B60J 5/107; B60J 5/108; B60J 7/08; B60J 7/106; B60J 7/141; B60J 7/16; B60J 7/1607; E05D 3/02; E05D 5/0207
(Continued)

(56) References Cited

U.S. PATENT DOCUMENTS 10,118,473 B2 *  11/2018  McDonald, II ......... E05B 83/18
11,780,306 B2 *  10/2023  Ireland ................... B60J 7/1607
                                                          296/100.07
(Continued)

FOREIGN PATENT DOCUMENTS

DE         1584059 A1    4/1969
DE    102005036596 B3    9/2006
WO      02070326 A1    9/2002

OTHER PUBLICATIONS

Extended European Search Report dated Oct. 23, 2023; Application No. EP 20884456.3-1009 / 4054894 PCT/US2020058645.

*Primary Examiner* — Jason S Daniels
(74) *Attorney, Agent, or Firm* — Barnes & Thornburg LLP

(57) ABSTRACT

A truck cap having a cap body with an opening, and a cap door that is movable between open and closed positions with respect to the opening. At least one hinge that attaches to the cap body and the cap door of the truck cap. The hinge includes a first hinge bracket member and a second hinge bracket member. The first hinge bracket member includes a hinge bracket to receive a pivot pin. The second hinge bracket member includes a hinge bracket with an opening sized to receive at least a portion of the pivot pin. The first hinge bracket member and the second hinge bracket member are pivotable with respect to each other about the pivot pin. A longitudinally extending gas prop pivotably attached to the pin extending from the second angled portion of the first hinge bracket member and to the pin of the second hinge bracket member.

20 Claims, 23 Drawing Sheets

Related U.S. Application Data continuation of application No. 17/086,857, filed on Nov. 2, 2020, now Pat. No. 11,279,213.

(60) Provisional application No. 62/930,428, filed on Nov. 4, 2019.

(58) Field of Classification Search
USPC .......................................... 296/100.02, 100.06
See application file for complete search history.

(56) References Cited

U.S. PATENT DOCUMENTS

| | | | | |
|---|---|---|---|---|
| 2003/0111867 | A1* | 6/2003 | Block | B60J 7/106 296/100.02 |
| 2008/0203756 | A1* | 8/2008 | Lake | B60P 7/02 296/100.08 |
| 2012/0292939 | A1* | 11/2012 | Daylong | B60P 3/14 296/37.6 |

* cited by examiner

TRUCK CAP

RELATED APPLICATIONS

The present application is a Continuation Application of U.S. patent application Ser. No. 17/695,165, filed on Mar. 15, 2022, and is also a Continuation Application of U.S. patent application Ser. No. 17/086,857, filed on Nov. 2, 2020, which issued as U.S. Pat. No. 11,279,213 on Mar. 22, 2022. The present application also relates to and claims priority to U.S. Provisional Patent Application Ser. No. 62/930,428, filed on Nov. 4, 2019. The subject matter disclosed in these applications are hereby expressly incorporated into the present Application in its entirety.

TECHNICAL FIELD AND SUMMARY

The present disclosure relates to trucks such as pickup trucks, and truck beds used on pickup trucks and like vehicles, and, in particular, a truck bed cap with improved features and design.

A truck bed cap is an enclosure that attaches to the top sidewalls of a pickup truck's cargo box or truck bed. The truck cap includes upward extending side and forward walls, and a door typically positioned at the rearward end above the truck bed's tailgate (although the door can be placed anywhere on the cap). Typically, the upward extending walls terminate at the approximate height of the pickup truck's cab section roof. This configuration enhances the pickup truck's aesthetic appearance similar to a sport utility vehicle (SUV). Embodiments of a truck cap are shown and described in US Patent Publication No. 2020/0130485, the disclosure of which is incorporated herein by reference.

An illustrative embodiment of the present disclosure provides a truck cap that sits on opposing sidewalls and over the top of a cargo box of a pickup truck. The truck cap comprises: a cap body having an opening; a cap door that is movable between open and closed positions with respect to the opening of the cap body; at least one truck cap door hinge that attaches to the cap body and the cap door of the truck cap; wherein the at least one truck cap door hinge includes: a first hinge bracket member and a second hinge bracket member; the first hinge bracket member is bent at an obtuse angle to form first and second angled portions separated by a vertex there between; the first angled portion of the first hinge bracket member includes a hinge bracket located at a position opposite the vertex; at least one pivot pin; the hinge bracket of the first angled portion includes at least one opening sized to receive at least a portion of the at least one pivot pin; the second angled portion of the first hinge bracket member includes a flange that extends substantially transverse to a longitudinal axis of the at least one pivot pin; the flange of the second angled portion includes a pin extending therefrom; the second hinge bracket member includes spaced apart first and second sidewalls each of which extends substantially transverse to the longitudinal axis of the at least one pivot pin; the second hinge bracket member includes a first pin located on the first sidewall of the second hinge bracket member and directed toward the second sidewall of the second hinge bracket member; the second hinge bracket member includes a second pin located on the second sidewall of the second hinge bracket member and directed toward the first sidewall of the second hinge bracket member; the second hinge bracket member includes a hinge bracket located adjacent an end of the second hinge bracket member; the hinge bracket of the second hinge bracket member includes at least one opening sized to receive at least a portion of the at least one pivot pin; at least a portion of the hinge bracket of the first hinge bracket member is located adjacent at least a portion of the hinge bracket of the second hinge bracket member such that the first hinge bracket member and the second hinge bracket member are pivotable with respect to each other about the at least one pivot pin; and a longitudinally extending gas prop pivotably attached to the first and second pins of the second hinge bracket member and pivotably attached to the pin on the flange of the second angled portion of the first hinge bracket member; the longitudinally extending gas prop is extendable approximately parallel to at least a portion of the first angled portion of the first hinge bracket member.

Another illustrative embodiment of the present disclosure provides a truck cap that sits on opposing sidewalls and over the top of a cargo box of a pickup truck. The truck cap comprises: a cap body having an opening; a cap door that is movable between open and closed positions with respect to the opening of the cap body; at least one truck cap door hinge that attaches to the cap body and the cap door of the truck cap; wherein the at least one truck cap door hinge includes: a first hinge bracket member and a second hinge bracket member; the first hinge bracket member is bent at an obtuse angle to form first and second angled portions separated by a vertex there between; the first angled portion of the first hinge bracket member includes a hinge bracket; at least one pivot pin; the hinge bracket of the first angled portion includes at least one opening sized to receive at least a portion of the at least one pivot pin; the first hinge bracket member includes a pin extending from the second angled portion; the second hinge bracket member includes at least one pin; the second hinge bracket member includes a hinge bracket; the hinge bracket of the second hinge bracket member includes at least one opening sized to receive at least a portion of the at least one pivot pin; the first hinge bracket member and the second hinge bracket member are pivotable with respect to each other about the at least one pivot pin; and a longitudinally extending gas prop pivotably attached to the pin extending from the second angled portion of the first hinge bracket member and to the at least one pin of the second hinge bracket member.

In the above and other embodiments, the at least one truck cap door hinge of the truck cap may further comprise: the hinge bracket of the first angled portion of the first hinge bracket member is located at a position opposite the vertex; the second angled portion of the first hinge bracket member includes a flange that extends substantially transverse to a longitudinal axis of the at least one pivot pin; the pin extends from the flange of the second angled portion; the second hinge bracket member has spaced apart first and second sidewalls, each of which extends substantially transverse to the longitudinal axis of the at least one pivot pin; the at least one pin of the second hinge bracket member is located on the first sidewall of the second hinge bracket member and directed toward the second sidewall of the second hinge bracket member; the second hinge bracket member having a second pin located on the second sidewall of the second hinge bracket member and directed toward the first sidewall of the second hinge bracket member; the hinge bracket of the second hinge bracket member is located adjacent to an end of the second hinge bracket member; at least a portion of the hinge bracket of the first hinge bracket member is located adjacent to at least a portion of the hinge bracket of the second hinge bracket member; the longitudinally extending gas prop is pivotably attached to the at least one pin and the second pin of the second hinge bracket member and pivotably attached to the pin that extends from the flange of the second angled portion of the first hinge bracket member; and the longitudinally extending gas prop is extendable approximately parallel to at least a portion of the first angled portion of the first hinge bracket member.

Another illustrative embodiment of the present disclosure provides a truck cap that sits on opposing sidewalls and over the top of a cargo box of a pickup truck. The truck cap comprises: a cap body having an opening; a cap door that is movable between open and closed positions with respect to the opening of the cap body; at least one truck cap door hinge that attaches to the cap body and the cap door of the truck cap; wherein the at least one truck cap door hinge includes: a first hinge bracket member and a second hinge bracket member; the first hinge bracket member includes a hinge bracket; at least one pivot pin; the hinge bracket of the first hinge bracket member includes at least one opening sized to receive at least a portion of the at least one pivot pin; the first hinge bracket member includes a pin extending there from; the second hinge bracket member includes at least one pin; the second hinge bracket member includes a hinge bracket; the hinge bracket of the second hinge bracket member includes at least one opening sized to receive at least a portion of the at least one pivot pin; the first hinge bracket member and the second hinge bracket member are pivotable with respect to each other about the at least one pivot pin; and a longitudinally extending gas prop pivotably attached to the pin extending from the second angled portion of the first hinge bracket member and to the at least one pin of the second hinge bracket member.

In the above and other embodiments, the at least one truck cap door hinge of the truck cap may further comprise: the first hinge bracket member is bent at an obtuse angle to form first and second angled portions separated by a vertex there between; the hinge bracket is located on the first angled portion of the first hinge bracket member; the hinge bracket of the first angled portion of the first hinge bracket member is located at a position opposite the vertex; the hinge bracket of the first angled portion includes the at least one opening sized to receive the at least the portion of the at least one pivot pin; the first hinge bracket member includes the pin extending from the second angled portion; and the longitudinally extending gas prop is extendable approximately parallel to at least a portion of the first angled portion of the first hinge bracket member.

Additional features and advantages of the truck bed cap features will become apparent to those skilled in the art upon consideration of the following detailed descriptions of carrying out the truck bed cap features as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the truck bed cap features, and such exemplification is not to be construed as limiting the scope of the truck bed cap features in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An embodiment of the present disclosure includes a new truck bed cap design that includes a resin transfer molded (RTM) rear door. The new door assembly is a one-piece-looking door. This design takes the spoiler and the door skirt and combines them into a singular piece that can be used in combination with additional hardware to create the rear door. The RTM process includes a vacuum to pull the resin material into a closed mold cavity, the material then bonds with the fiberglass fibers and pads that are in there to create a solid door with a class A surface on both sides. The fiberglass shell itself was designed so it is essentially in line or flush with the outside surface of the glass to get a wraparound look. And then with a dual painting process a full glass look is created. The RTM rear door combines the spoiler and the door skirt with connecting materials so that it is built to look like one solid piece. Fasteners may be bonded to the glass. This allows removal of a couple of different bolts and the glass can be repaired or replaced if needed enhancing serviceability. There is no high-visible exterior hardware—no handles, no locks, no hinges—showing. Illustratively, there may be a small plastic cap that can be moved to reveal a mechanical lock underneath for manual operation.

Figure 1:
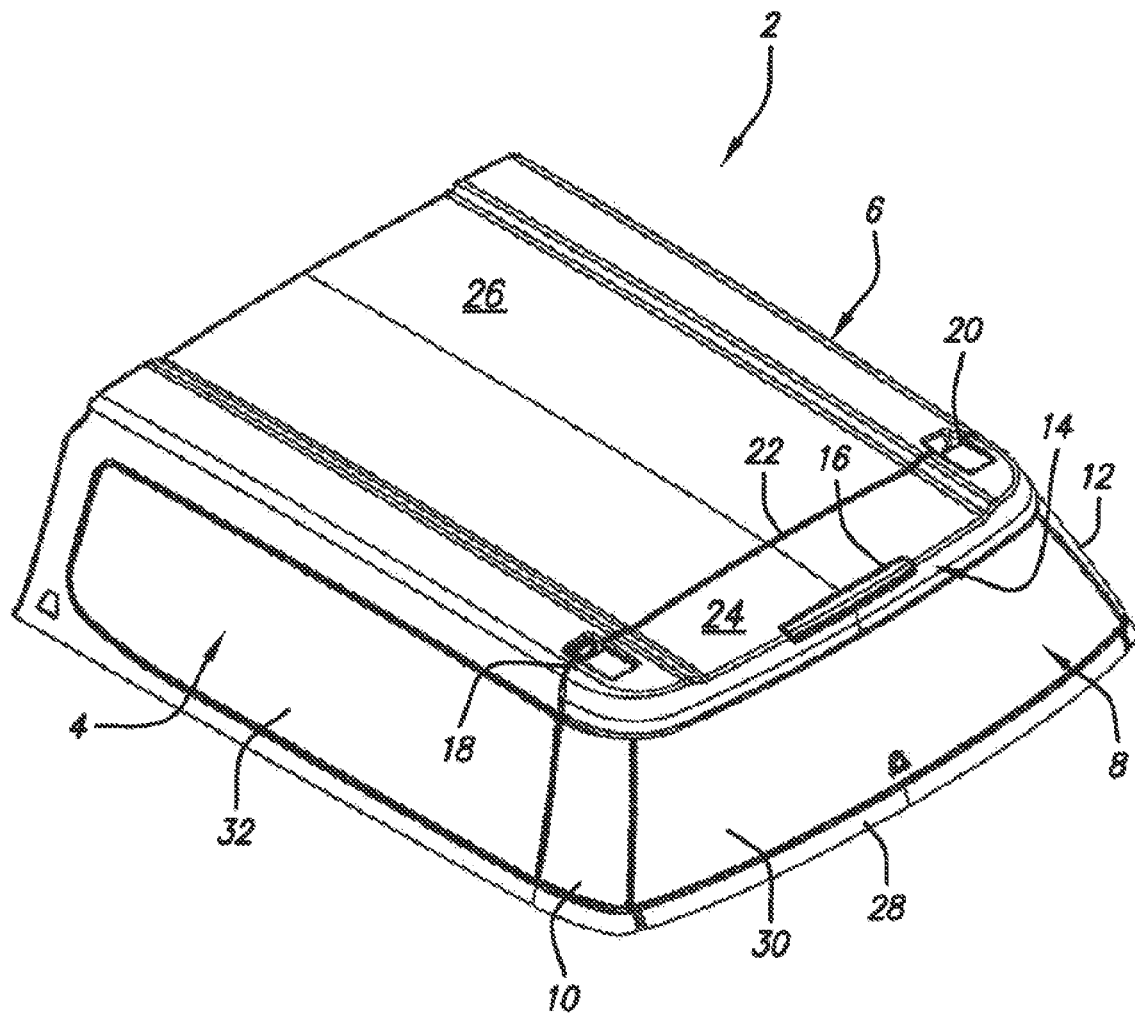
FIG. 1 is a perspective view of a truck cap.

A perspective view of truck cap 2 is shown in FIG. 1. Truck cap 2 includes downward depending sidewalls 4 and 6 and a door 8 illustratively located at the rear end of truck cap 2. Pillars 10 and 12 bound the sides of door 8. A spoiler section 14, which includes an illustrative back brake light 16 occupies the upper portion of door 8. Also according to this illustrative embodiment, depressions 18 and 20 are shown located at seam 22 between top portion 24 of spoiler section 14 and roof panel 26 of truck cap 2. At the lower end of door 8 is door skirt 28 adjacent to window portion 30 of door 8.

Figure 3:
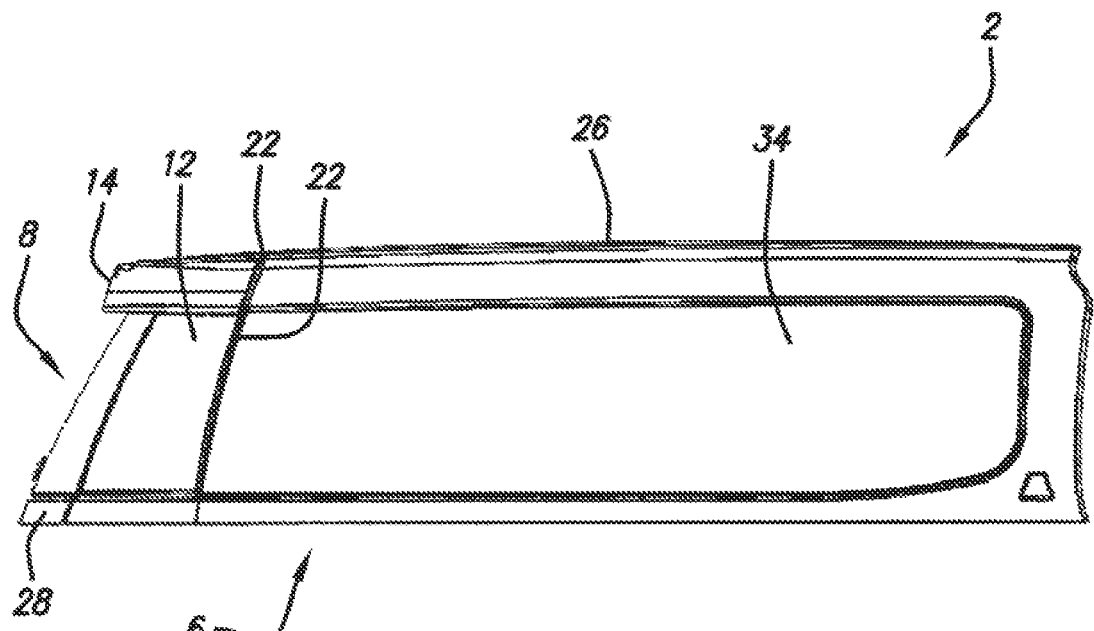
FIG. 3 is a left side elevational view of the truck cap.

Part of each of sidewalls 4 and 6 are cap windows 32 and 34 (see, FIG. 3). In this illustrative embodiment, cap windows 32 and 34 occupy a substantial portion of sidewalls 4 and 6, respectively.

Figure 2:
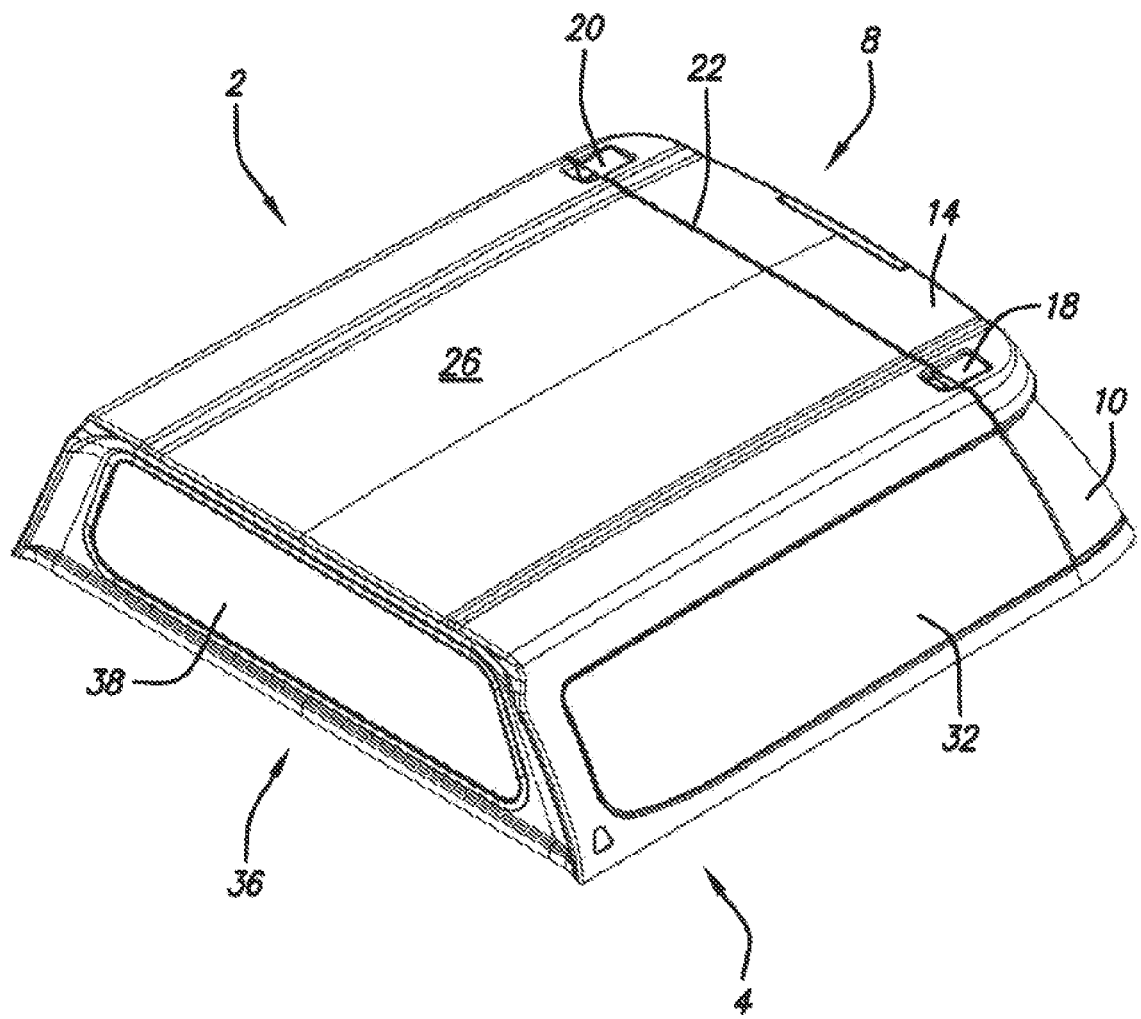
FIG. 2 is a front perspective view of the truck cap.

A front perspective view of truck cap 2 is shown in FIG. 2. This view similarly shows door 8 having spoiler section 14 on top, and depressions 18 and 20 at seam 22. Pillar 10 and front wall 36 of sidewall 4 are also shown. A distinction between views is front wall 36 located at the forward end of truck cap 2 shown in FIG. 2. Front window 38 is shown occupying a substantial portion of front wall 36.

Figure 4:
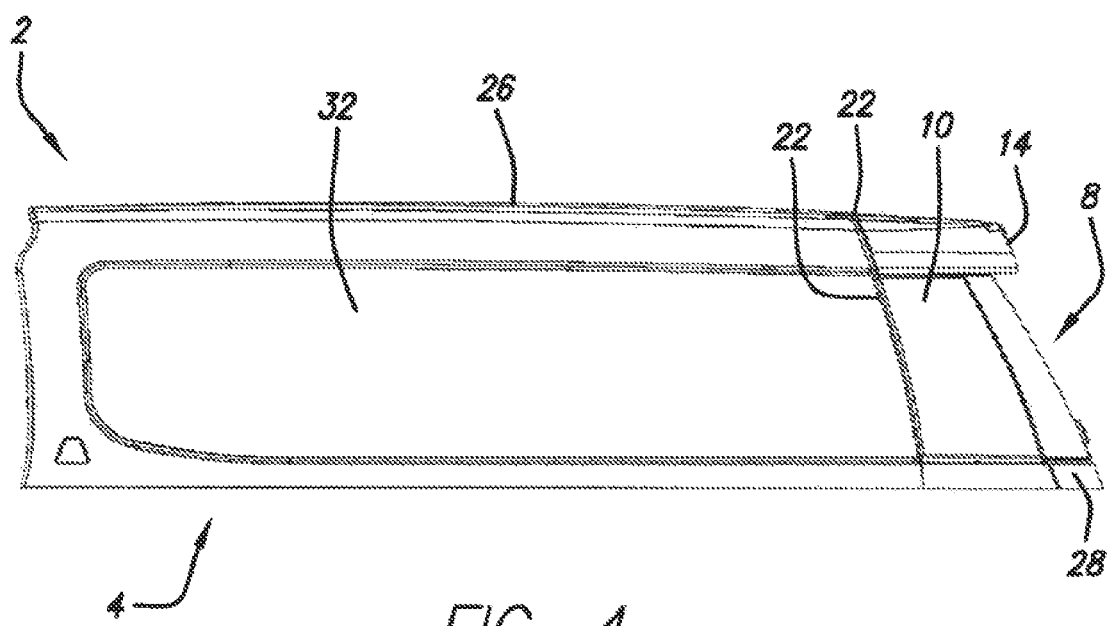
FIG. 4 is a right side elevational view of the truck cap.

FIGS. 3 and 4 are left side and right side elevational views of truck cap 2, respectively. These views show sidewalls 4 and 6 with cap windows 32 and 34, respectively. Depending from roof panel 26 are pillars 10 and 12 shown upwardly extending between each of cap windows 32, 34, and door 8. Spoiler section 14 extends outwardly at the upper portion of door 8. Door skirt 28 is located at the lower periphery of door 8 opposite spoiler section 14. In this illustrative embodiment, seam 22 is shown extending not only between roof panel 26 and spoiler section 14, but also between cap windows 32 and 34 and corresponding pillars 10 and 12.

Figure 5:
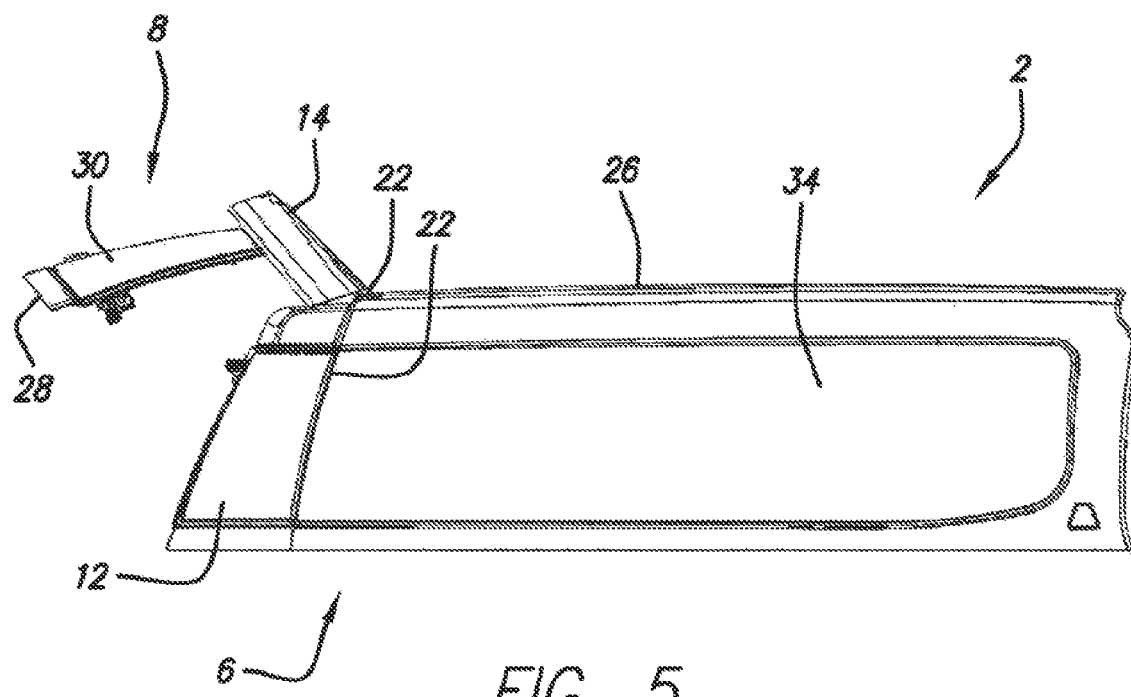
FIG. 5 is another left side elevational view of the truck cap with the door located in an open position.
Figure 6:
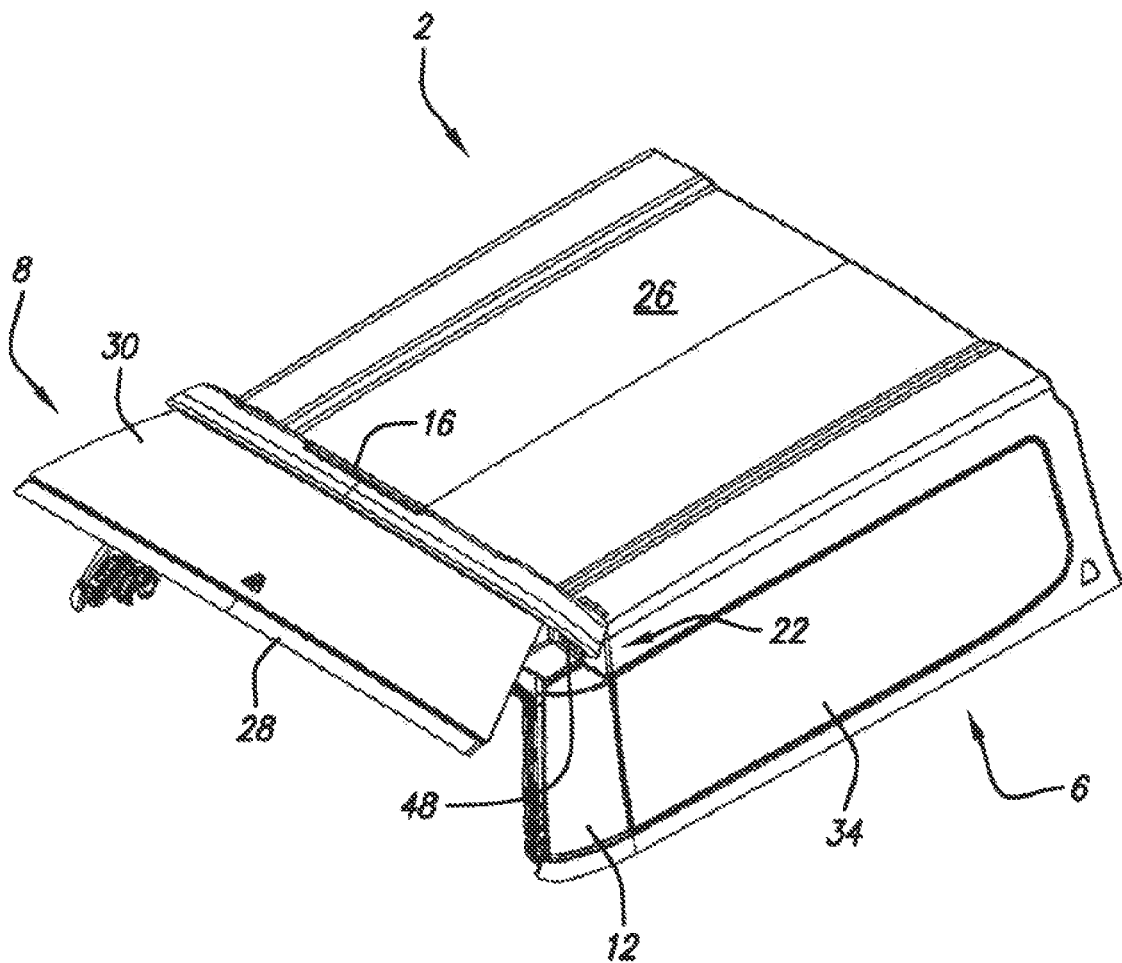
FIG. 6 is a rear perspective view of the truck cap with the door located in the open position.
Figure 7:
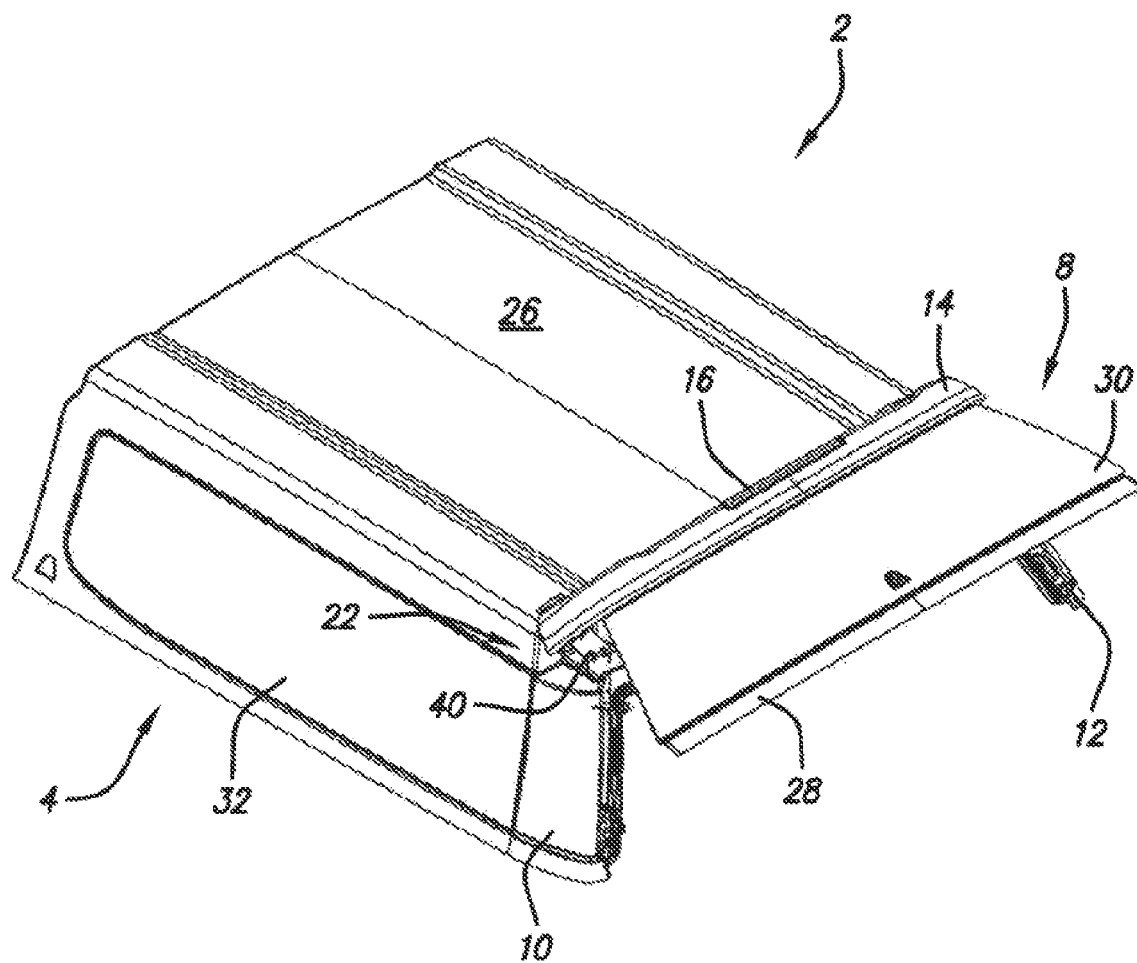
FIG. 7 is another rear perspective view of the truck cap with the door located in the open position.
Figure 12A:
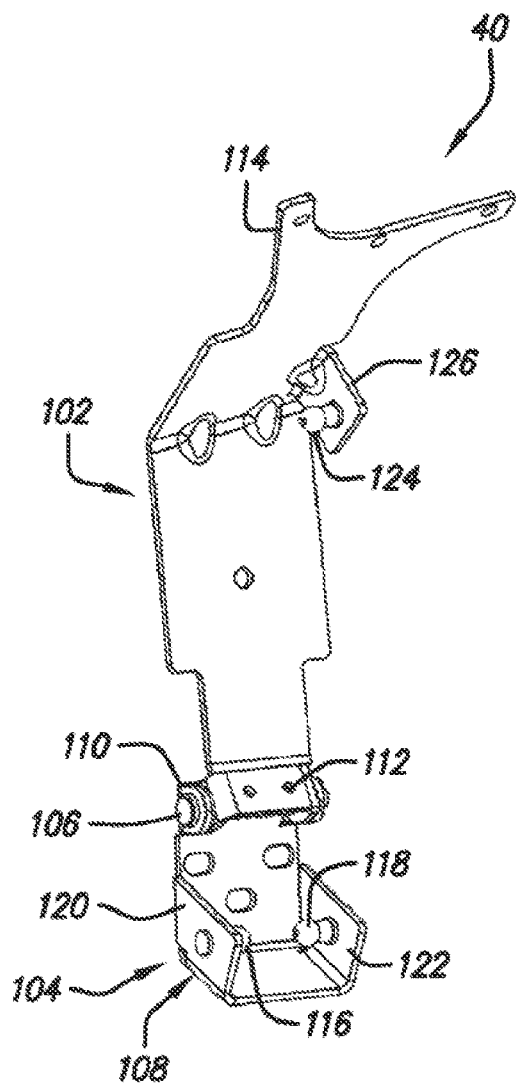
FIG. 12A is a front perspective view of a truck cap door hinge.
Figure 12B:
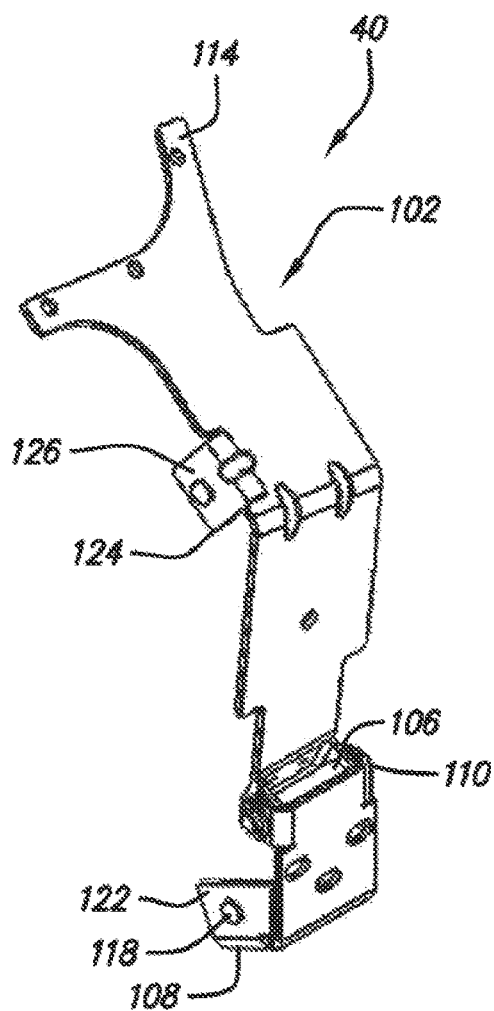
FIG. 12B is a rear perspective view of the truck cap door hinge.

Side elevational, left perspective, and right perspective views of truck cap 2 with door 8 pivoted upwardly in its open position are shown in FIGS. 5, 6, and 7. As appreciated by these views, the majority of door 8 is composed of window portion 30 bounded at the top by spoiler section 14 and at the bottom by door skirt 28. Hinges 40 and 42 (see, also, FIGS. 12A and 12B) are located adjacent to pillars 10 and 12, respectively, and are recessed back toward seam 22 (see, also, FIG. 9). Further shown in these views are back brake light 16, cap windows 32 and 34 of sidewalls 4 and 6, respectively, and roof panel 26.

Figure 8:
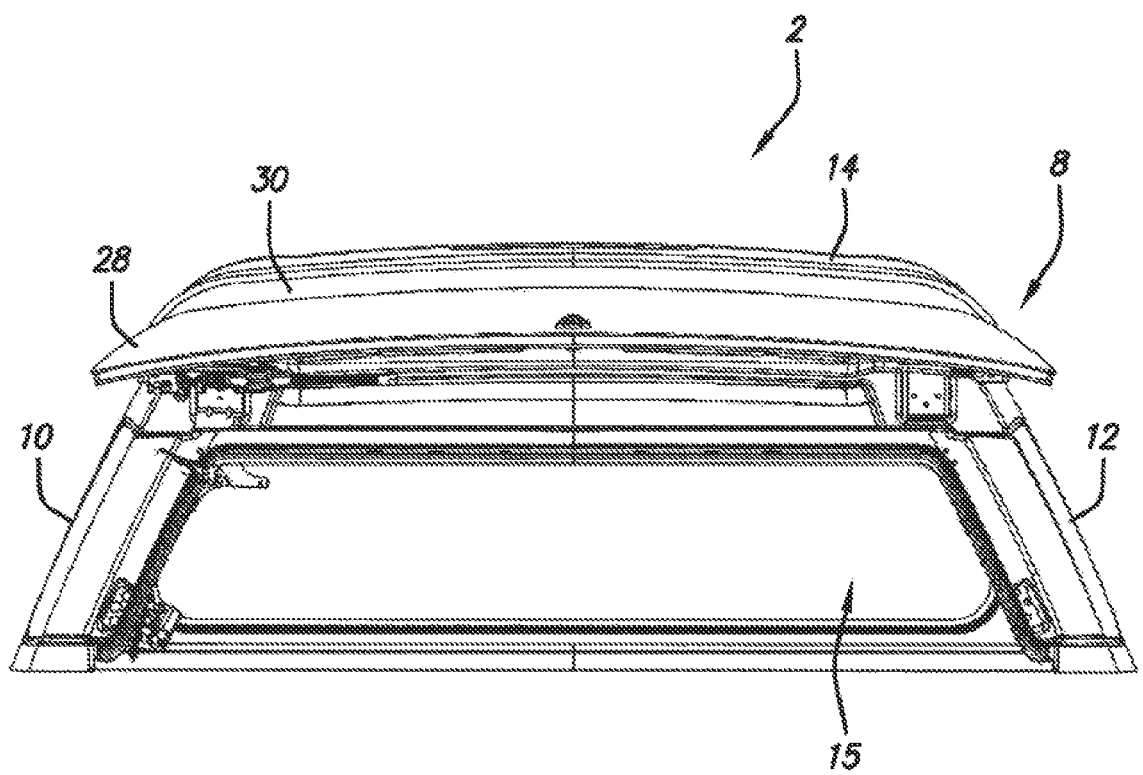
FIG. 8 is a rear view of the truck cap with the door located in the open position.

A rear view of truck cap 2 with door 8 extended upward in its open position (like that shown in FIGS. 5, 6, and 7) are also shown in FIG. 8. Cap opening 15 is revealed when cap door 8 is open. This view also shows door skirt 28 affixed to window portion 30, which is attached to spoiler section 14. This view also shows pillars 10 and 12 extending upwardly at the rear periphery of truck cap 2.

Figure 9:
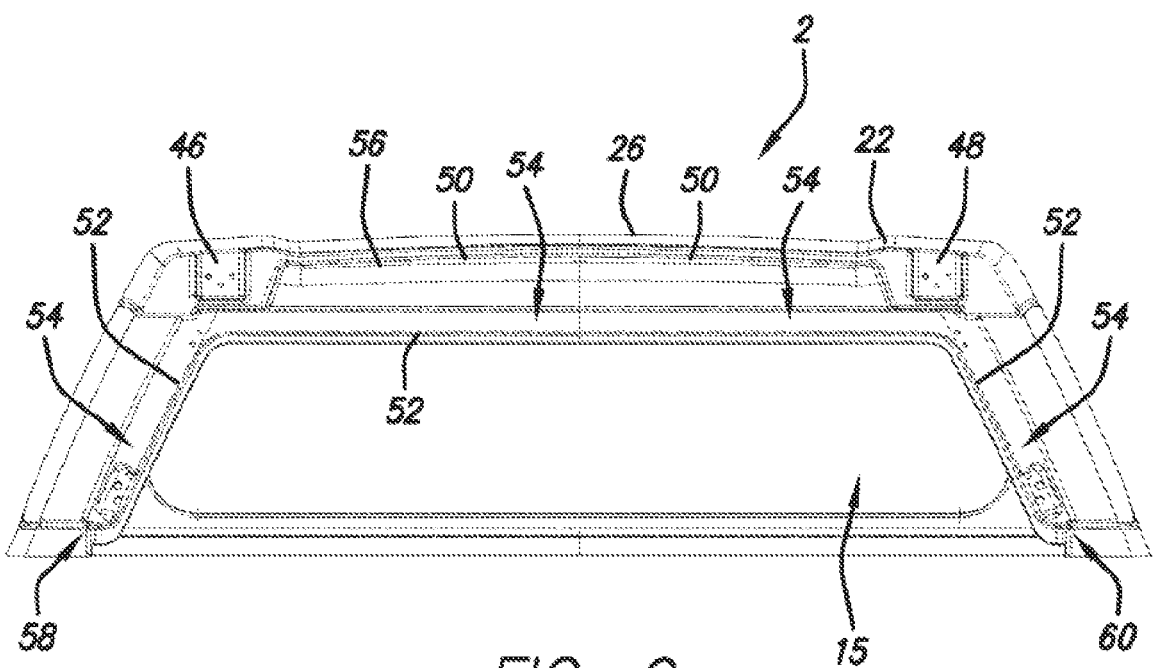
FIG. 9 is a rear view of the truck cap with the door removed.

Another rear view of truck cap 2 but this time with door 8 removed is shown in FIG. 9. At the upper rear portion of truck cap 2 adjacent to roof panel 26 are hinge ports 46 and 48, respectively. An illustrative embodiment of the present disclosure includes a water management system that mitigates the risk of water entering seam 22 and migrating into cap opening 15, thereby leaking into the truck bed. In this illustrative embodiment, during construction of truck cap 2, the water management is molded into the body. In this case, if water does seep into truck cap 2 at seam 22, the water will be directed away from cap opening 15 and follows a flow path to exit towards the bottom of truck cap 2. As shown in this view, at seam 22 there is an upper seal 50. This creates a sealing means between the top portion of seam 22 and cap door 8. Additionally, there is a door seal 52 located about the periphery of the cap opening 15 of truck cap 2. This seal on truck cap 2 engages the interior of cap door 8 in order to create a sealing means between those two structures. As a contingency, however, around the periphery of door seal 52 is a trough 54 that extends the width of truck cap 2.

Trough 54 is a channel-like feature that collects any water that rolls from roof panel 26 at seam 22 towards cap opening 15. This may occur if cap door 8 is positioned upwardly in its open position. In this illustrative embodiment, the upper shelf 56 is formed at the top end of the rear portion of truck cap 2. Upper shelf 56 includes a compound crown that will direct water towards its periphery and into trough 54. There the water can drain to outlets 58 or 60 at the periphery of trough 54 towards the lower rear portion of truck cap 2.

Figure 10:
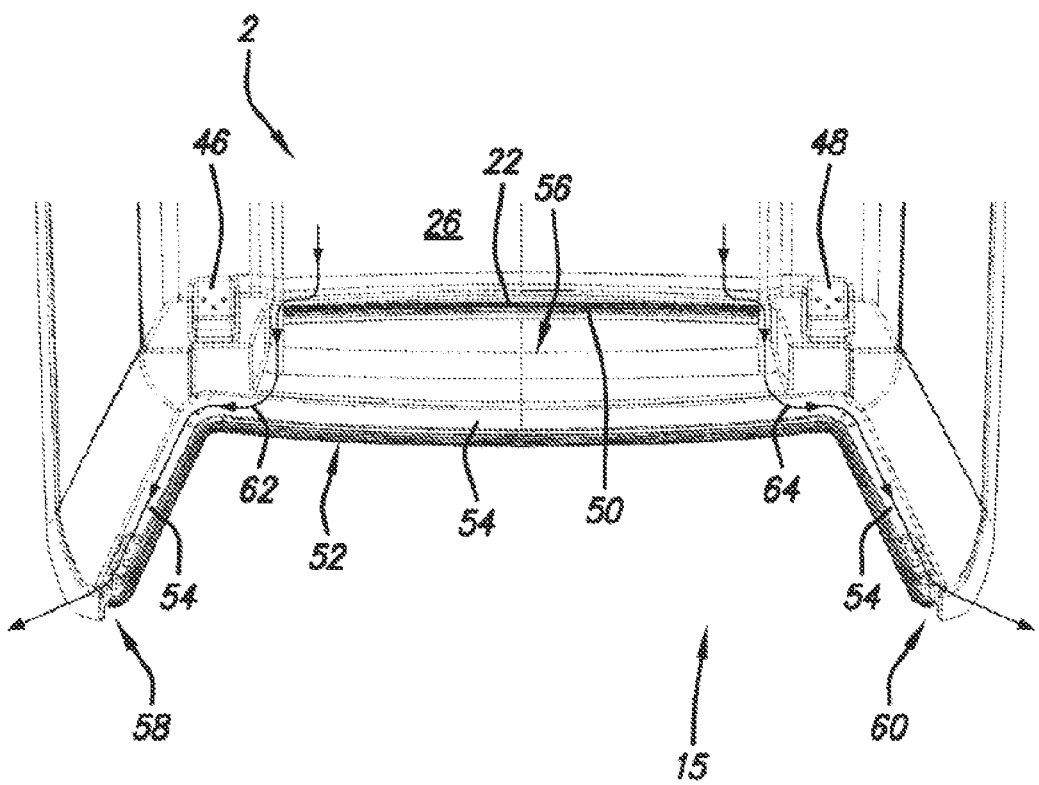
FIG. 10 is a top perspective view of the truck cap with the door removed.

A top perspective view of the rear portion of truck cap 2 is shown in FIG. 10. Here is depicted seam 22 of roof panel 26 with upper seal 50 extending a portion there across. This view also shows hinge ports 46 and 48. Cap door seal 52 is shown lining the periphery of cap opening 15. Trough 54 lines door seal 52 as illustratively shown. If water, as shown by directional arrows 62 and 64, migrates past seam 22 and onto upper shelf 56, the water is directed toward the sides of truck cap 2 and into trough 54. Water on one side will be directed towards trough 54 is indicated by directional arrows 62 and water on the other side of roof panel 26 will be directed towards the side and flow into trough 54 as indicated by directional arrows 64. In both cases, the water is then permitted to exit at outlets 58 and 60 located towards the bottom of truck cap 2. With this water management, water can be substantially prevented from entering the truck bed through cap opening 15 if draining from roof panel 26.

Figure 11:
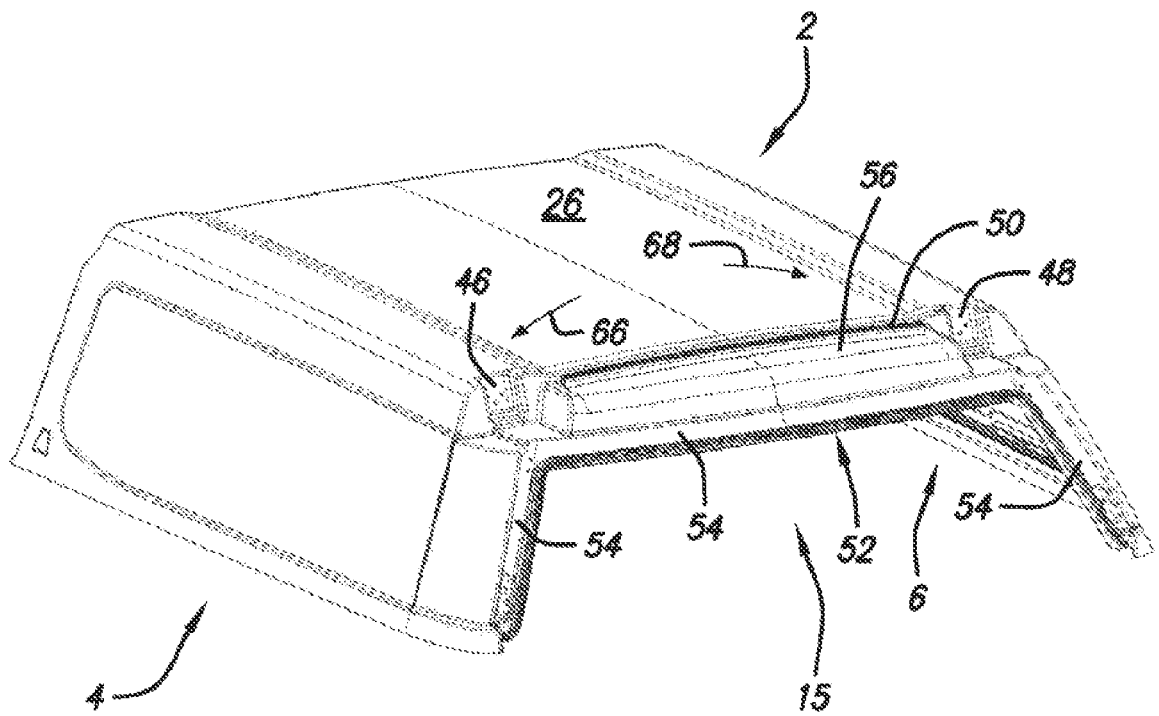
FIG. 11 is a rear perspective view of the truck cap with the door removed.

In the rear perspective view shown in FIG. 11, it is evident how roof panel 26 of truck cap 2 is crowned so that water drains towards the sides as indicated by directional arrows 66 and 68. Likewise, upper shelf 56 is crowned so that water will drain into trough 54.

Another illustrative embodiment of the present disclosure includes a hinge system that pivots cap door 8 between opened and closed positions. The hinge design may incorporate gas props that assist in opening cap door 8. The hinge design may include a first bracket that bolts to cap door 8, and a second bracket that bolts to hinge ports 46 and 48 above the cap pillars adjacent to seam 22 (see FIG. 9). Door hinge 40 is shown in front and rear perspective views in FIGS. 12A and 12B. Hinge 40 includes a first bracket member 102 and a second bracket member 104 connected together via pivot pin 106. It is notable in this illustrative embodiment that first bracket member 102 is not identically shaped or symmetrical with second hinge bracket member 104. In particular, the length of second hinge bracket member 104 from end 108 to pivot bracket 110 is shorter than the length from pivot bracket 112 on first hinge bracket member 102 up to its end 114. This is because either pivot pins 116 or 118 on sidewalls 120 or 122, respectively, are configured to pivotably receive one end of extending gas prop 128 (see, FIG. 13A) which is also pivotably attached to pin 124 on flange or side bracket 126 located upwardly on first hinge bracket member 102.

Gas props are longitudinally moving air-powered arms that extend when an initial force is applied to a movable structure. Such gas props are widely used in the truck and automobile industries. Typically, however, such gas props are attached to a doorjamb at one end and a pivoting door at the other end. In this instance, however, both ends of the longitudinally extending gas prop are attached to opposing sides of a hinge itself. The difference in length between first hinge bracket member 102 and second hinge bracket member 104 is based on the characteristics of the door that is intended to be opened. It is appreciated that such lengths may be varied depending on the needs for a particular door. Illustratively, first hinge bracket member 102 may attach to the inside of cap door 8 and second hinge bracket member 104 may attach to the wall structure adjacent to seam 22. When cap door 8 is opened it pivots on pivot pin 106 at seam 22 while gas prop 128 assists in movement.

Figure 13A:
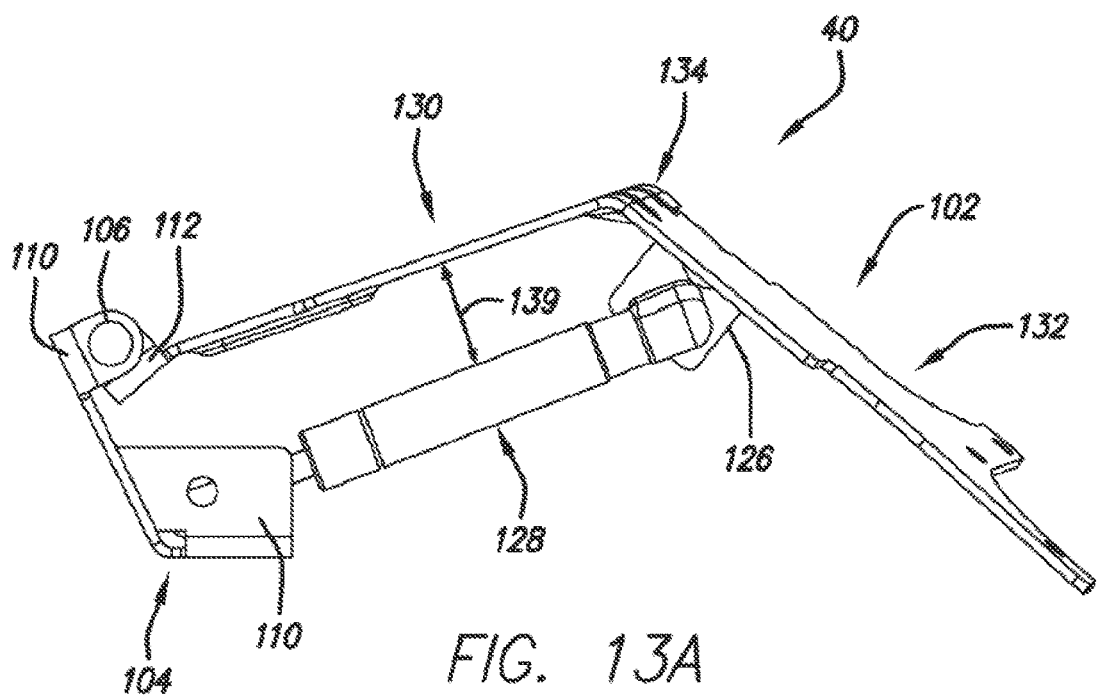
FIG. 13A is a perspective view of the truck cap door hinge in a folded position.
Figure 13B:
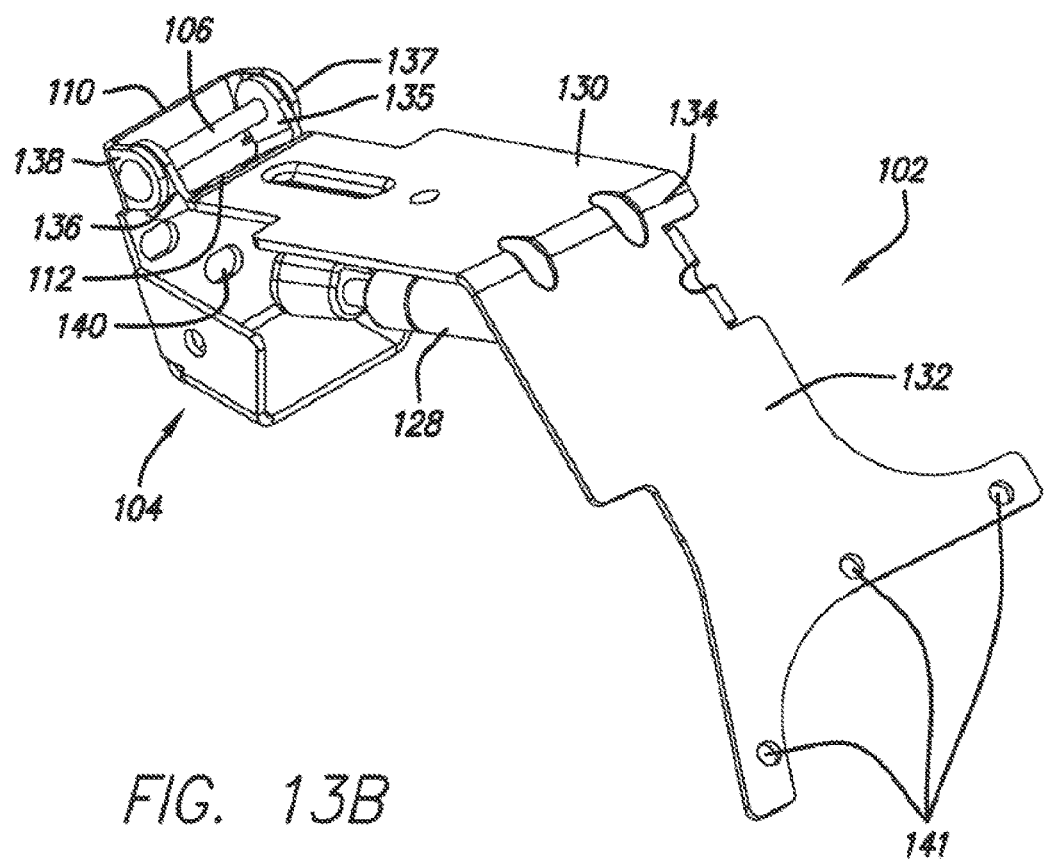
FIG. 13B is a top perspective view of the truck cap door hinge in the folded position.
Figure 13C:
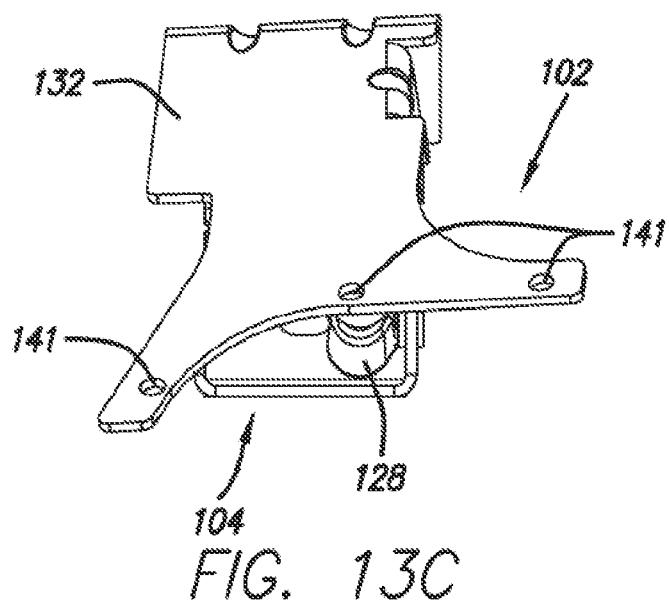
FIG. 13C is a top view of the truck cap door hinge in the folded position.
Figure 13D:
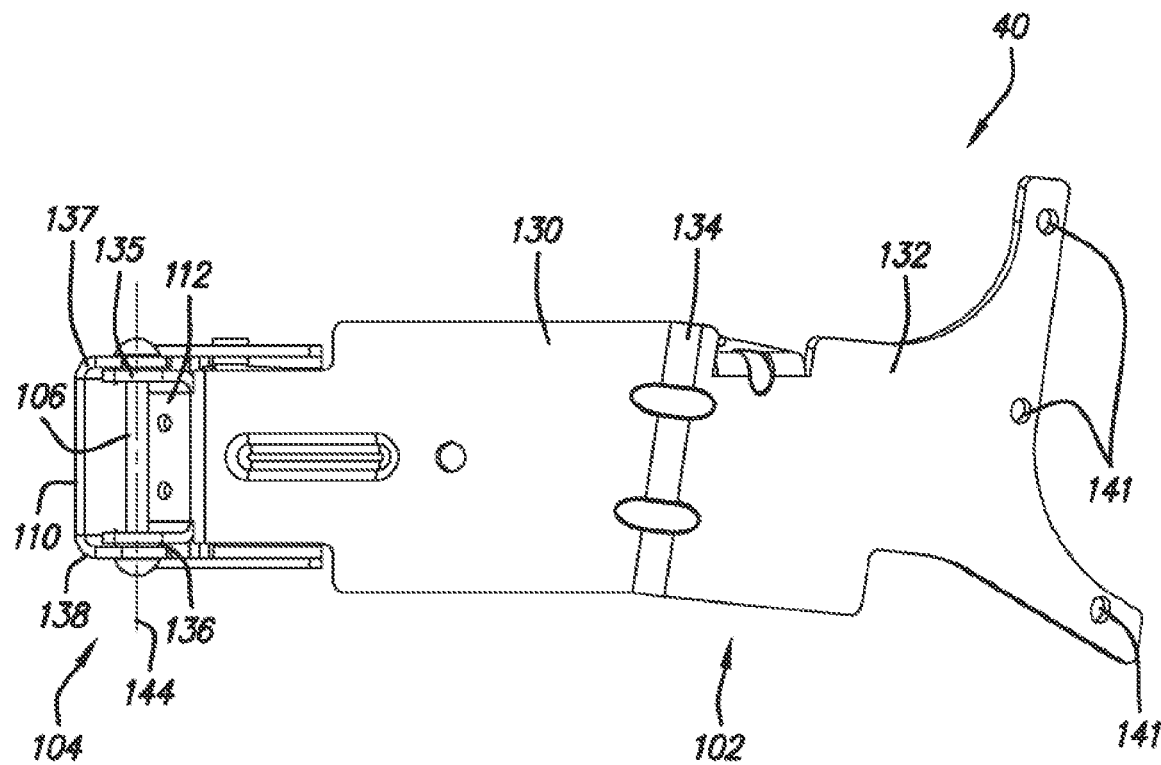
FIG. 13D is a rear view of the truck cap door hinge in the folded position.

Various perspective views of hinge 40 are shown in FIGS. 13A-13D and 14A-14D. The side view of bracket 40 shown in FIG. 13A depicts a gas prop 128 attached to pin 124 on side bracket 126. Gas prop 128 is also attached onto sidewalls 120 and 122 of second hinge bracket member 104. Particularly, gas prop 128 pivotably attaches to pins 116 or 118. This means gas prop 128 is pivotably attached to both first hinge bracket member 102 and second hinge bracket member 104. First hinge bracket member 102 is shown divided into a first angled portion 130 and a second angled portion 132. A vertex 134 is positioned there between forming an obtuse angle between first angled portion 130 and second angled portion 132. Pivot bracket 110 extending from first angled portion 130 receives pivot pin 106 in flanges 135 and 136 located adjacent to flanges 137 and 138 of pivot bracket 110 of second hinge bracket member 104 (see, also, FIGS. 13B and 13D). Pivot pin 106 is also received in flanges 137 and 138. As notably shown in FIGS. 13D and 14D pivot pin 106 forms an axis of rotation 144 about which first and second hinge bracket members 102 and 104, respectively, pivot.

Figure 14A:
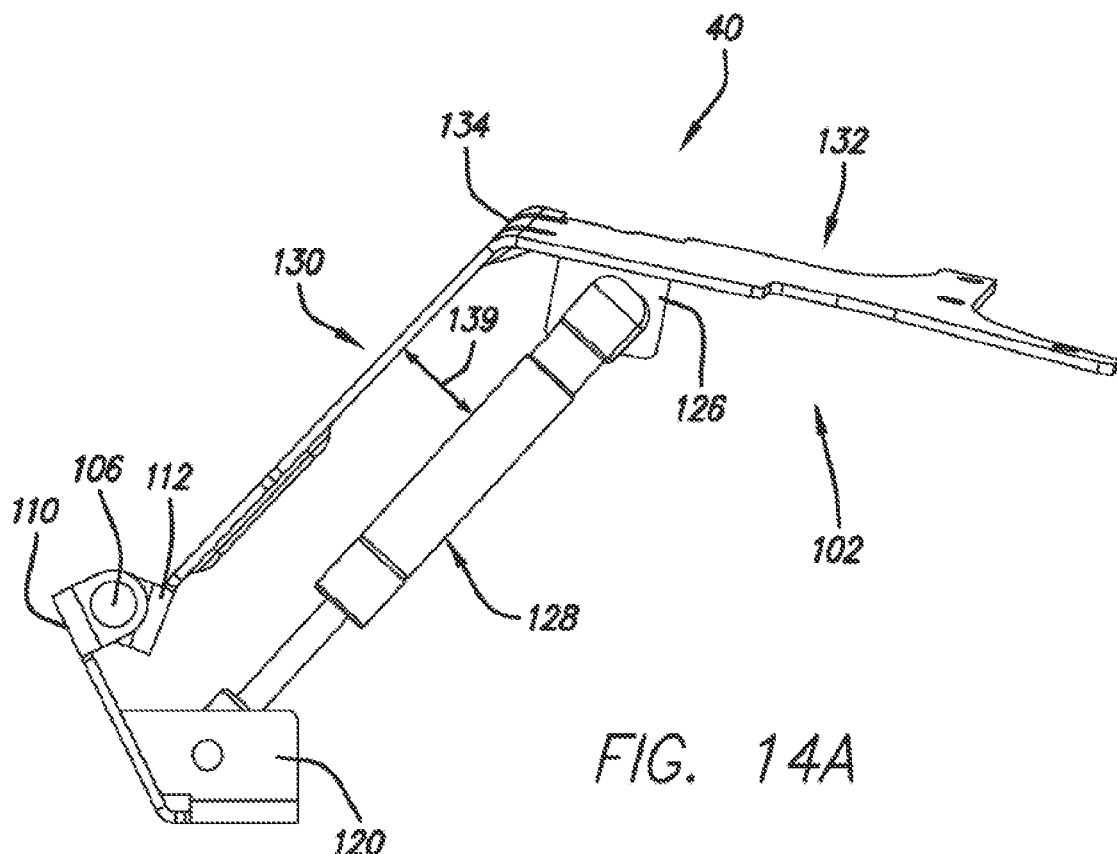
FIG. 14A is a perspective view of the truck cap door hinge in an unfolded position.
Figure 14B:
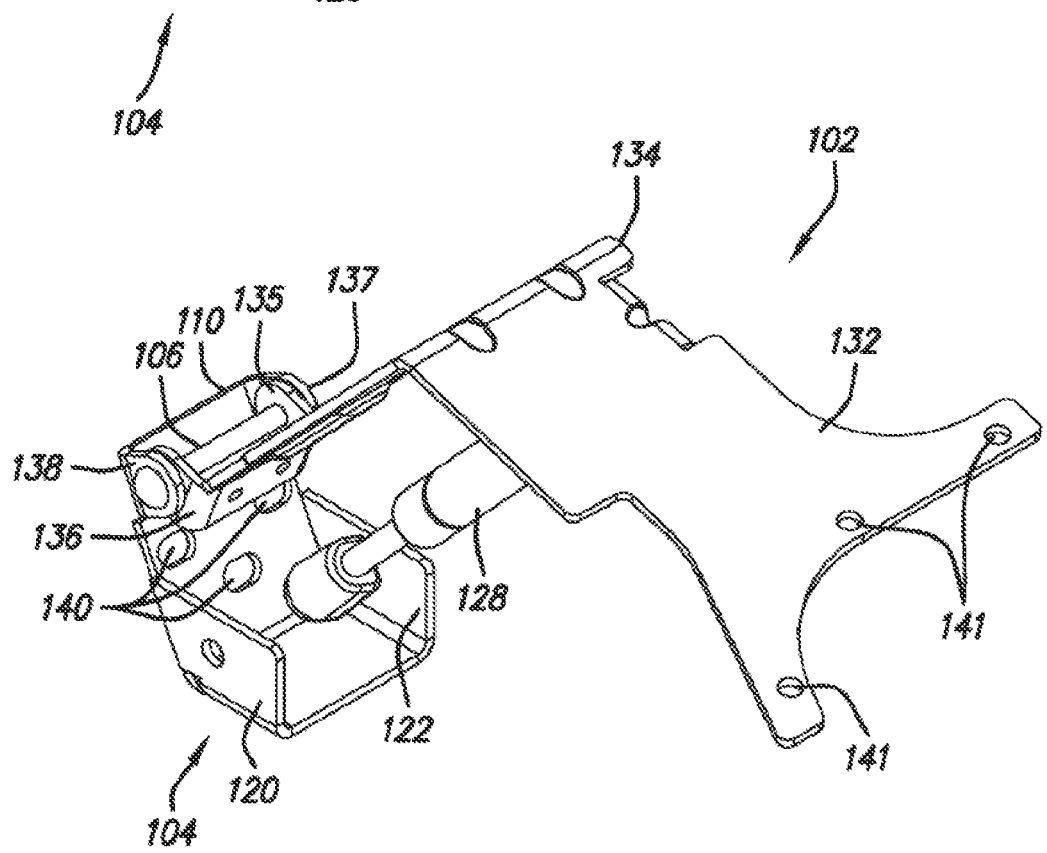
FIG. 14B is a top perspective view of the truck cap door hinge in the unfolded position.
Figure 14C:
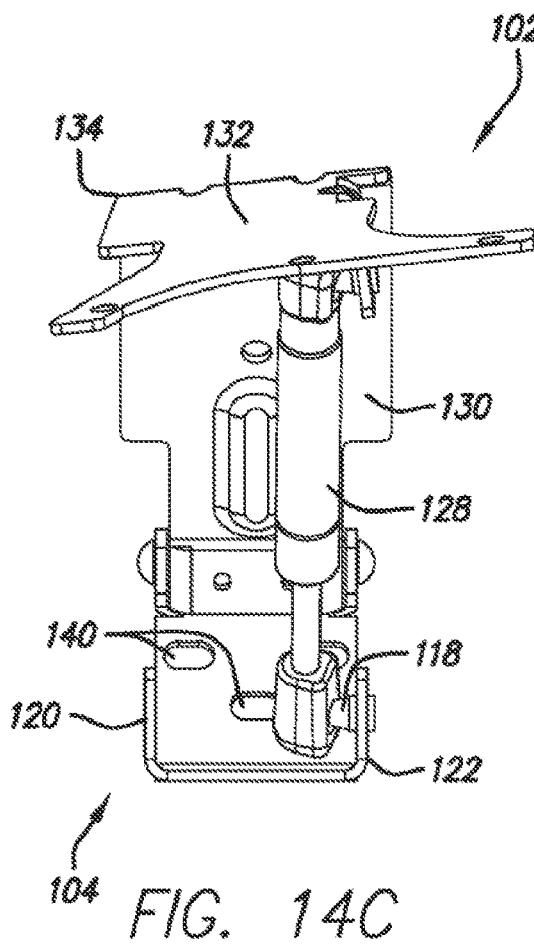
FIG. 14C is a top view of the truck cap door hinge in the unfolded position.
Figure 14D:
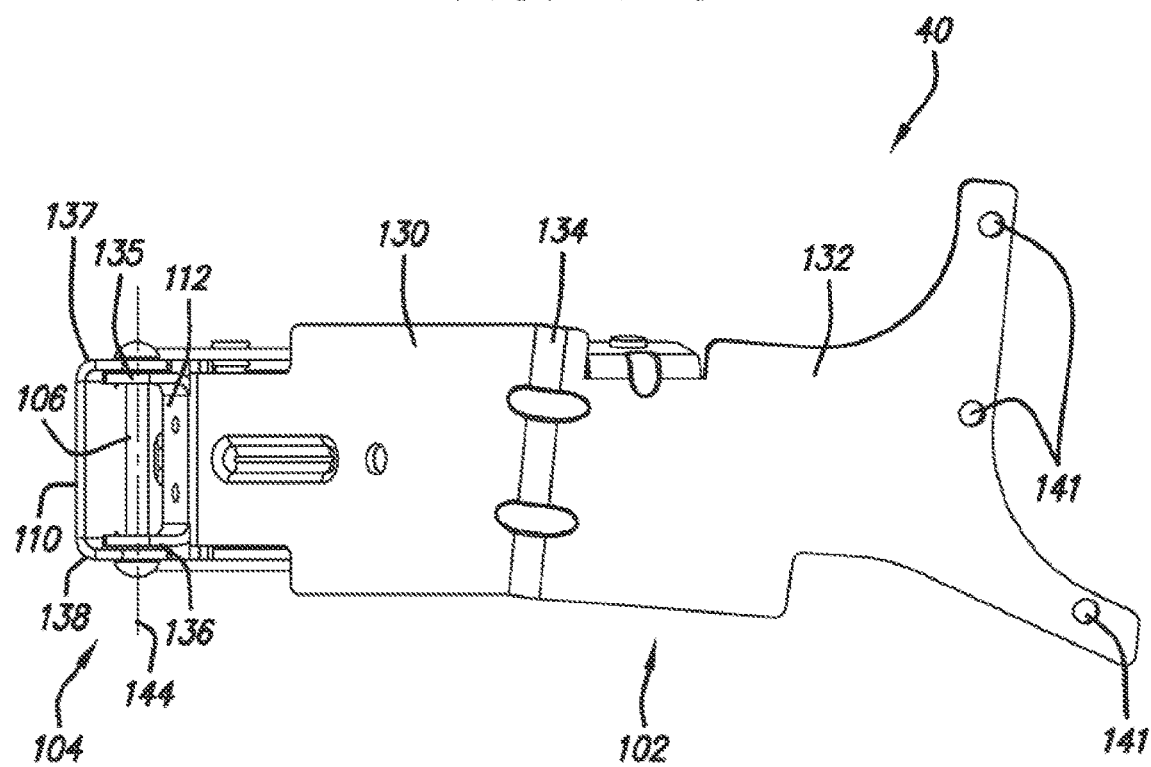
FIG. 14D is a rear view of the truck cap door hinge in the unfolded position.

In the illustrative embodiment, and as shown in both FIGS. 13A and 14A, gas prop 128 remains generally parallel to the longitudinal extent of first angled portion 130 as indicated by distance 139. It is further appreciated that in other embodiments, gas prop 128 may not necessarily be parallel with a longitudinal extent of first angle portion 130 but may maintain a substantially consistent distance also represented by distance 139 despite hinge 40 being located in either an open or closed position. This allows a variety of hinge bracket member configurations to swing a cap door between open and closed positions by only linearly extending or retracting gas prop 128 on hinge 40 (compare FIGS. 13A and 14A).

The additional views in FIGS. 13B, 13C, 14B and 14C illustrate how linear extension and retraction of gas prop 128 attached to each side of hinge 40 pivots same between its closed position (see, also, FIG. 13A) and its open position (see, also, FIG. 14A). It is appreciated that bores 140 disposed through second hinge bracket member 104 are configured to receive fasteners to attach second hinge bracket member 104 to the cap whereas bores 141 of second angled portion 132 of first hinge bracket member 102 are configured to receive other fasteners to attach first hinge bracket member 102 to cap door 8 (see FIGS. 13B, 13C, 13D, 14B, 14C, and 14C). It is further appreciated that hinge 42 may illustratively be identical or a mirror image version of hinge 40.

Another illustrative embodiment of the present disclosure provides a ceiling-mounted audio/video system. In the illustrative embodiments there are no fasteners penetrating through the cap roof. Lamination plates are formed onto the substrate of the cap ceiling that may attach to the systems. It is contemplated that a video monitor mount may be motorized to extend or retract same between use and stowed positions. It is further contemplated that additional devices may connect to the video monitor, such as cable TV lines, antennas, and other like inputs/outputs. Anything a home entertainment system can attach to may be attached to the video monitor. These attachments may also be made without any visible hardware such as fasteners attached to the audio/video mounting system from outside of the tuck cap.

Figure 15:
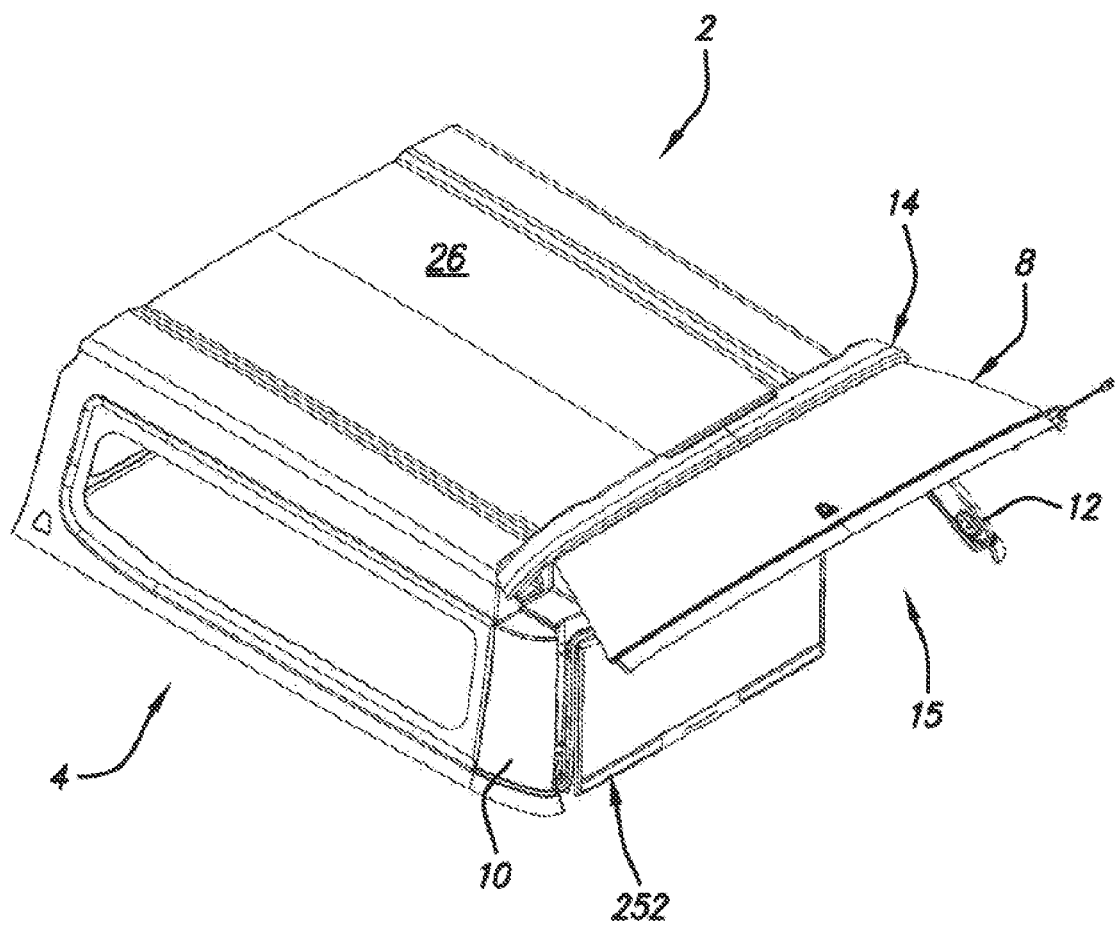
FIG. 15 is a rear perspective view of the truck cap with a video monitor lowered from the truck cap to its use position.

A perspective view of truck cap 2 with door 8 located in the open position and a video display 252 lowered to a use position within cap 2 is shown in FIG. 15. Illustratively, it is contemplated that video display 252 may be moved between a stowed position and a use position. As shown here, video display 252 occupies at least a portion of cap opening 15 between pillars 10 and 12 and under either or both roof panel 26 and/or spoiler section 14. This allows viewing of video display 252 outside of the truck cap 2.

Figure 16:
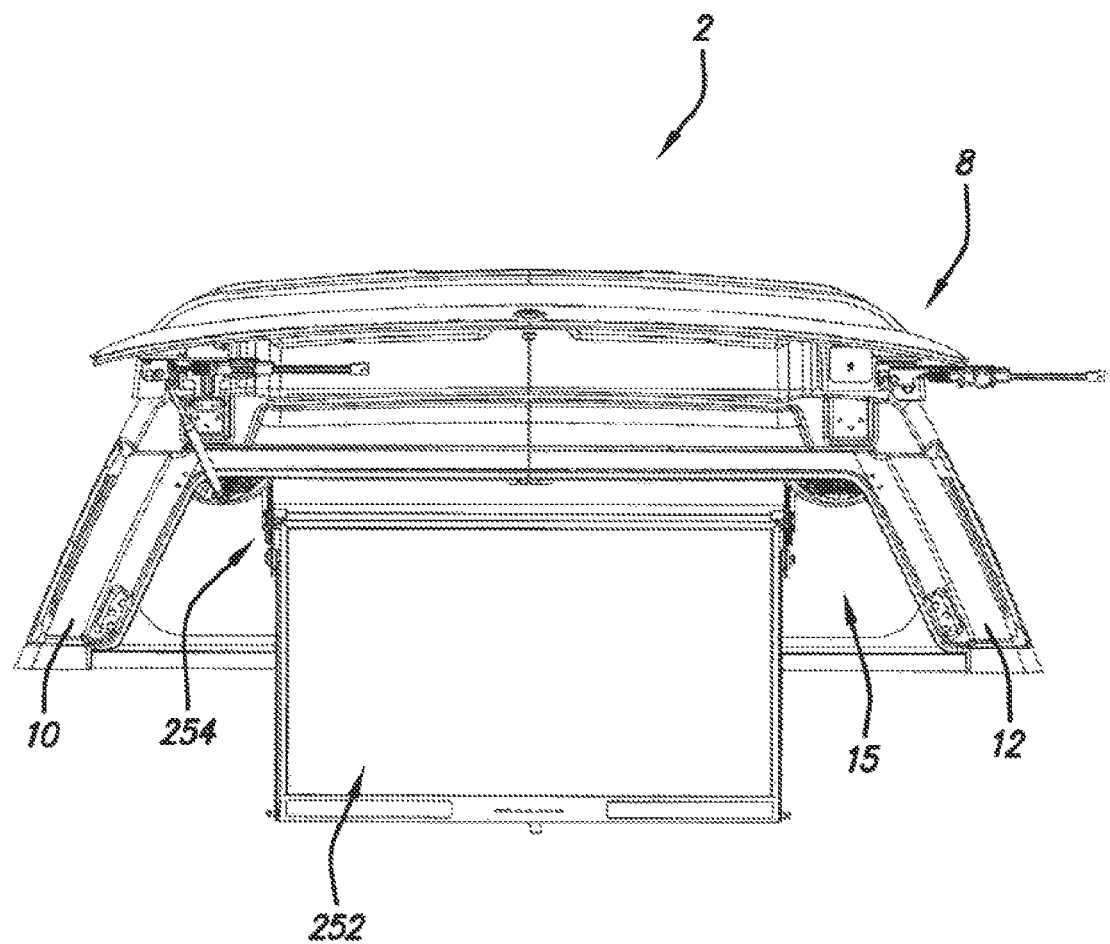
FIG. 16 is a rear view of the truck cap with the video monitor lowered from the truck cap to its use position.

A rear view of truck cap 2 with door 8 raised to its open position with video display 252 lowered to its use position at cap opening 15 is shown in FIG. 16. With door 8 raised, video display 252 may be viewed from outside of truck cap 2 while being supported from ceiling 268 via video screen mount assembly 254. If video display 252 is not desired to be used, it can be lifted and slid upwardly underneath ceiling 268 remaining out of the way allowing more use of the interior of truck cap 2 (see, also, FIGS. 8 and 19). Having the versatility of stowing video display 252 at the ceiling area of truck cap 2 (see, also, FIG. 19) most of the space available within the truck bed and cap may still be used without interference from video display 252.

Figure 17:
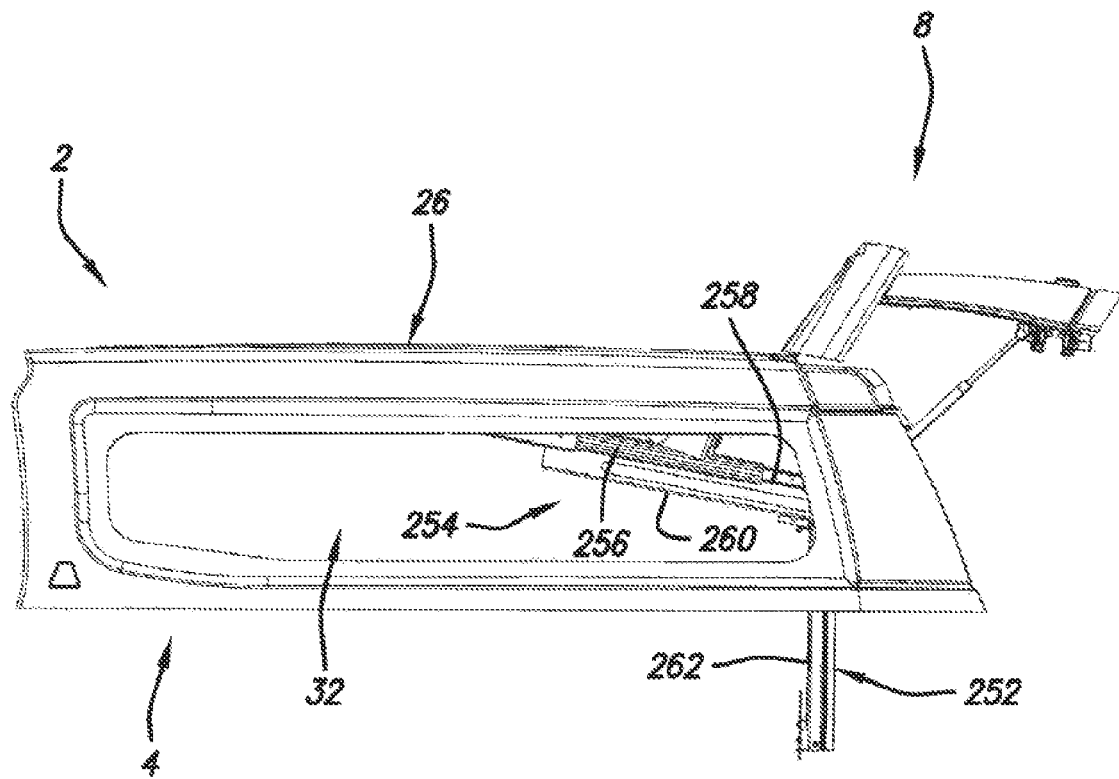
FIG. 17 is a side view of the truck cap with the video monitor lowered from the truck cap to its use position.

A side view of truck cap 2 with door 8 located at its upward open position is shown in FIG. 17. In this view, through cap window 32 on sidewall 4 a portion of video screen mount assembly 254 is visible, including telescoping sliders 256 and 258 supporting pivot mount brackets 260 and 261 (see, also, FIG. 22). A screen mounting bracket 262 may be located behind video display 252 for supporting same. As shown herein, telescoping sliders 256 and 258 may extend at a downward, illustratively, acute angle from roof panel 26. Video display 252 supported by screen mounting bracket 262 may then be positioned vertically to allow access and viewing. In this illustrative embodiment, the downward angle of telescoping sliders 256 and 258 allow the top of video display 252 to not be obscured by door 8 (see, also, FIG. 16). It will be appreciated by the skilled artisan upon reading this disclosure that the downward slope of the components of video screen mount assembly 254 may vary as needed to create a desired viewing position of video display 252 with respect to other structures within cap 2.

Figure 18:
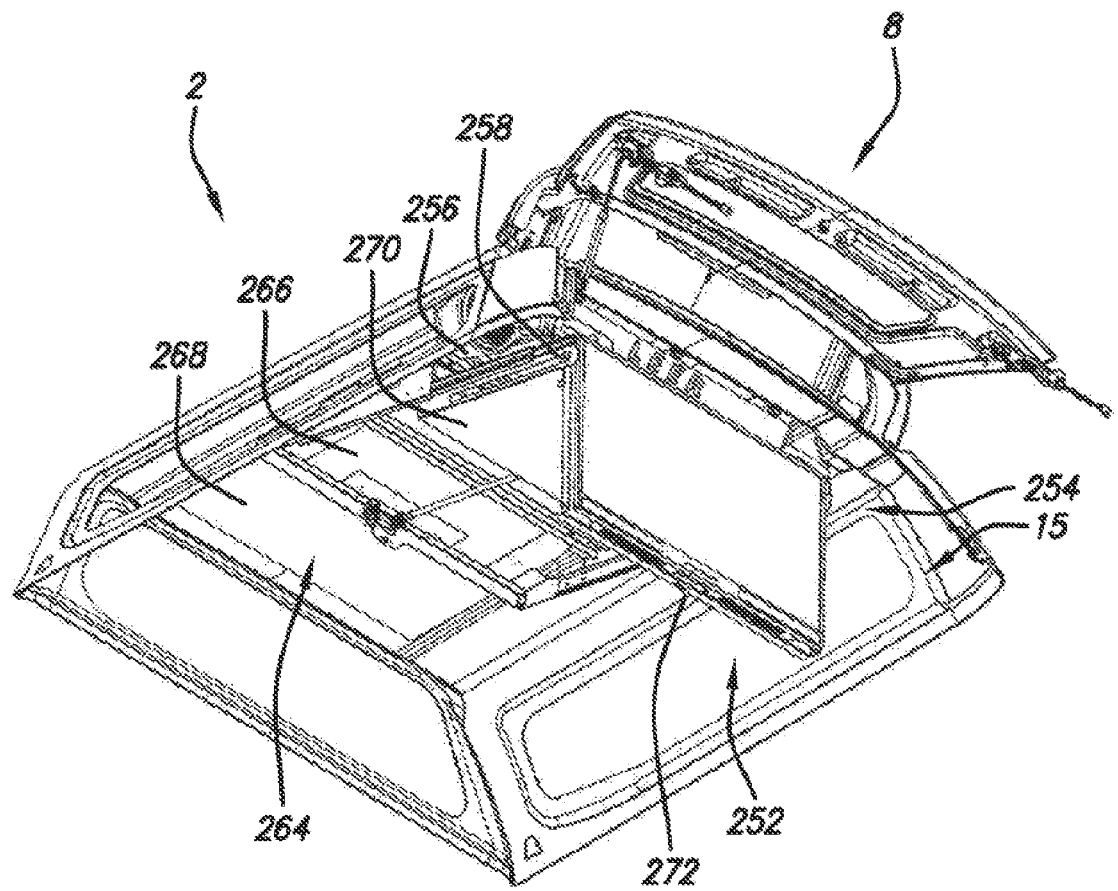
FIG. 18 is an underside view of the truck cap with a video screen mount assembly lowered from the truck cap to its use position.

An underside perspective view of truck cap 2 with video screen mount assembly 254 extending video display 252 to its lowered use position is shown in FIG. 18. A rafter array 264 is attached to plates 266 which are attached to ceiling 268 of roof panel 26. Fasteners attach rafter array 264 to plate 266 to hold video screen mount assembly 254 in place. In an illustrative embodiment, jack nuts may be inserted into plates 266 which are attached to ceiling 268 during manufacture of truck cap 2. The result is threaded bores located at ceiling 268 can receive fasteners to secure rafter array 264 to ceiling 268. As such, no fasteners extend through roof panel 26. A tray 270 is movable with pivot mount brackets 260 and 261 (see FIG. 22) to provide a support surface for video display 252 when stowed adjacent to rafter array 264. It is appreciated that tray 270 may be retractable on telescoping sliders 256 and 258 to extend and retract between use and stowed positions. Tray 270 is located in its extended position so that video display 252 may be pulled there from, and pivoted downward to the use position, as shown.

Figure 19:
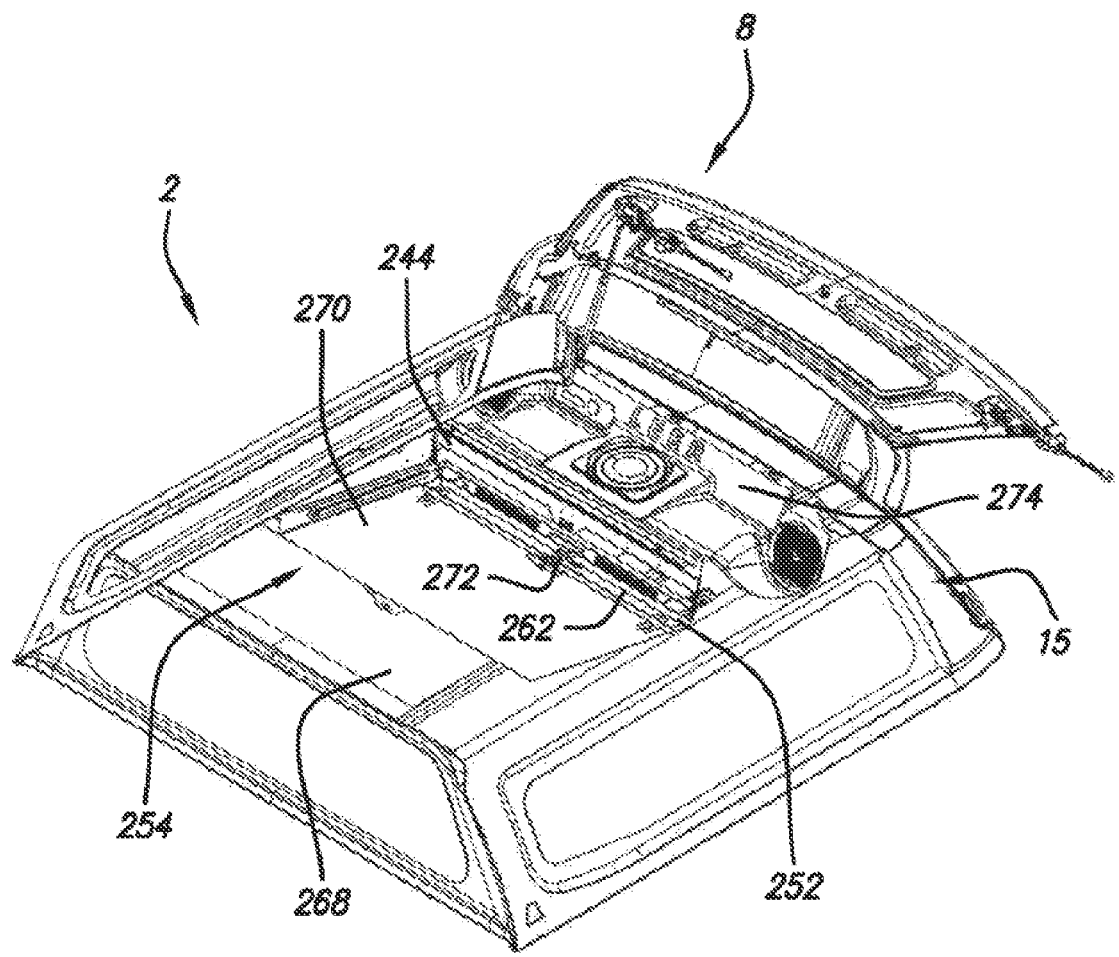
FIG. 19 is another underside view of the truck cap with the video screen mount assembly raised to its stowed position.

Another underside perspective view of truck cap 2 with door 8 upwardly extended in its open position and including video screen mount assembly 254 is shown in FIG. 19. As shown herein, tray 270 with video display 252 supported thereon is now retracted adjacent to rafter array 264 to a stowed position. It can be appreciated from this view how video display 252, lifted up adjacent to ceiling 268 of truck cap 2, keeps video display 252 out-of-the-way allowing space inside the truck bed and cap to be utilized for other purposes. It is further appreciated that screen mounting bracket 262 attached to the back of video display 252 includes a latch that may be selectively released from tray 270 such that it may be pulled at an angle moving video display 252 on tray 270 towards cap opening 15 and the use position. This movement may be accomplished either manually or mechanically.

Also shown in this view is an illustrative audio system 274 that may be used in conjunction with or independently of video display 252. It is appreciated that audio system 274 may be attached to plate 266 similar to that of video screen mount assembly 254. In particular, audio system 274 may be attached such that there are no bolts, screws or other fastening structures extending up through ceiling 268 and roof panel 26. Again, jack nuts may be used in plates 266 to receive other bolts or fasteners to attach audio system 274 to ceiling 268.

Figure 20:
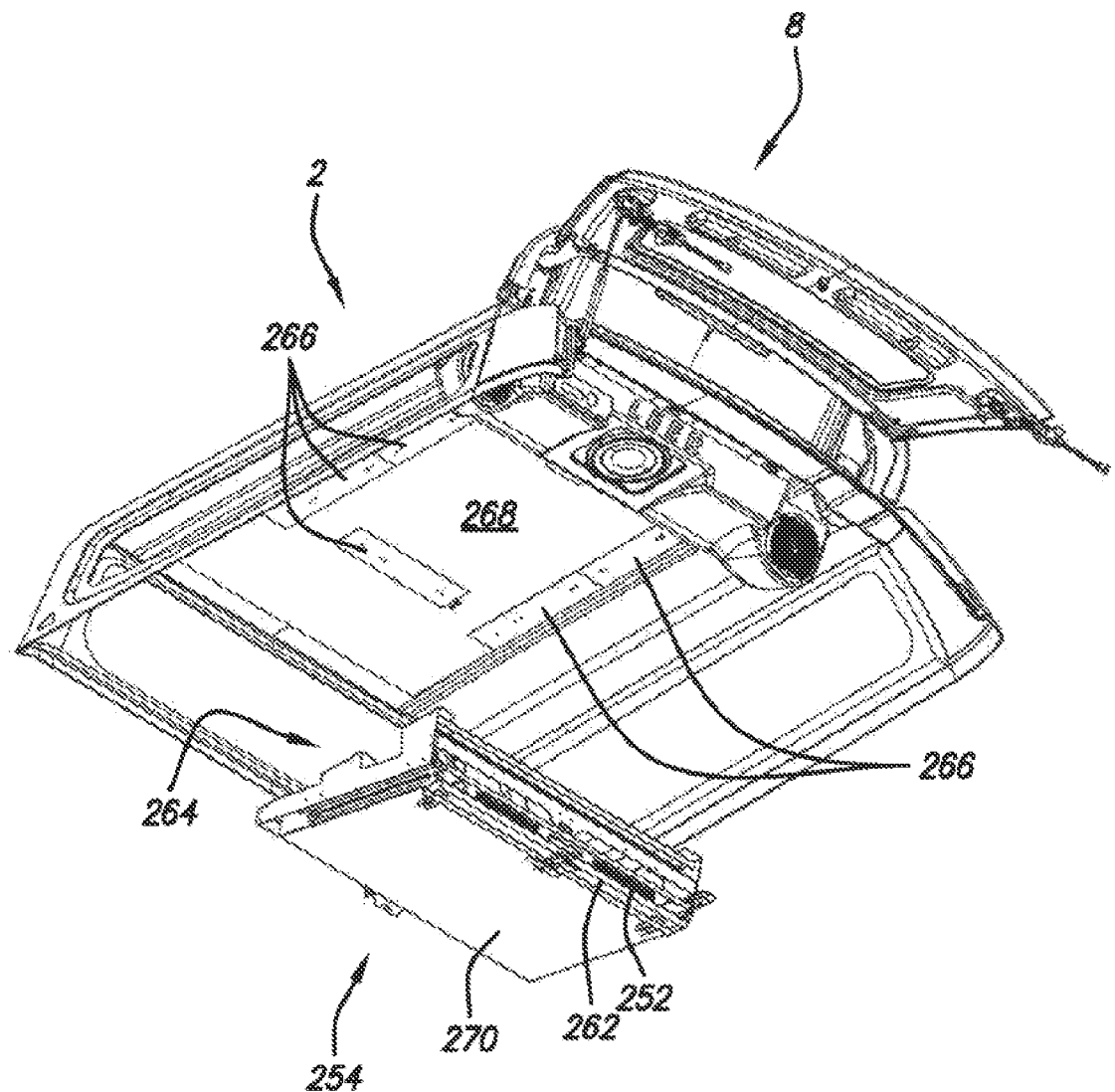
FIG. 20 is another underside view of the truck cap with the video screen mount assembly spaced apart from the truck cap.

A partially exploded view of truck cap 2 with door 8 located in its upward open position and with video screen mount assembly 254 separated there from, is shown in FIG. 20. In this case, video screen mount assembly 254 includes video display 252 retracted with screen mounting bracket 262 and tray 270 located in their stowed position adjacent to rafter array 264. A plurality of plates 266 are shown attached to ceiling 268 inside truck cap 2 opposite roof panel 26. It is appreciated that such plates 266 may be laminations that are fixed in place during the molding process of truck cap 2. Plates 266 may be arranged in any fashion to allow embedded jack nuts or other threaded or tactical bores to attach to structures such as audio system 274 and/or video screen mount assembly 254. By providing plates 266 into the molded structure of ceiling 268, any myriad of devices, may be attached thereto without resorting to drilling through the entire thickness of roof panel 26. Here, the locations of plates 266 are arranged so as to fasten to rafter array 264 in order to secure video screen mount assembly 254 to ceiling 268 of truck cap 2.

During manufacture of truck cap 2, plates 266 may be installed at the time the fiberglass structure of truck cap 2 is formed. Plates 266 sit on top of an illustrative tri-cell core (i.e., honeycomb-type structure) substrate. When a pilot hole for the jack nut is drilled, the drill makes its way into the core which provides sufficient clearance under roof panel 26. When the jack nut is inserted, it passes through a headliner, ceiling 268, plate 266, and into the core. When the jack nut is collapsed, its wings rest on plate 266. The fastener (i.e., bolt or screw) is then used to secure the audio/video components to plate 266. The fasteners are long enough to pass through the plate 266, headliner, etc., engage the jack nut, and occupy a portion of the void in the core, but short enough not to engage roof panel 26.

Figure 21:
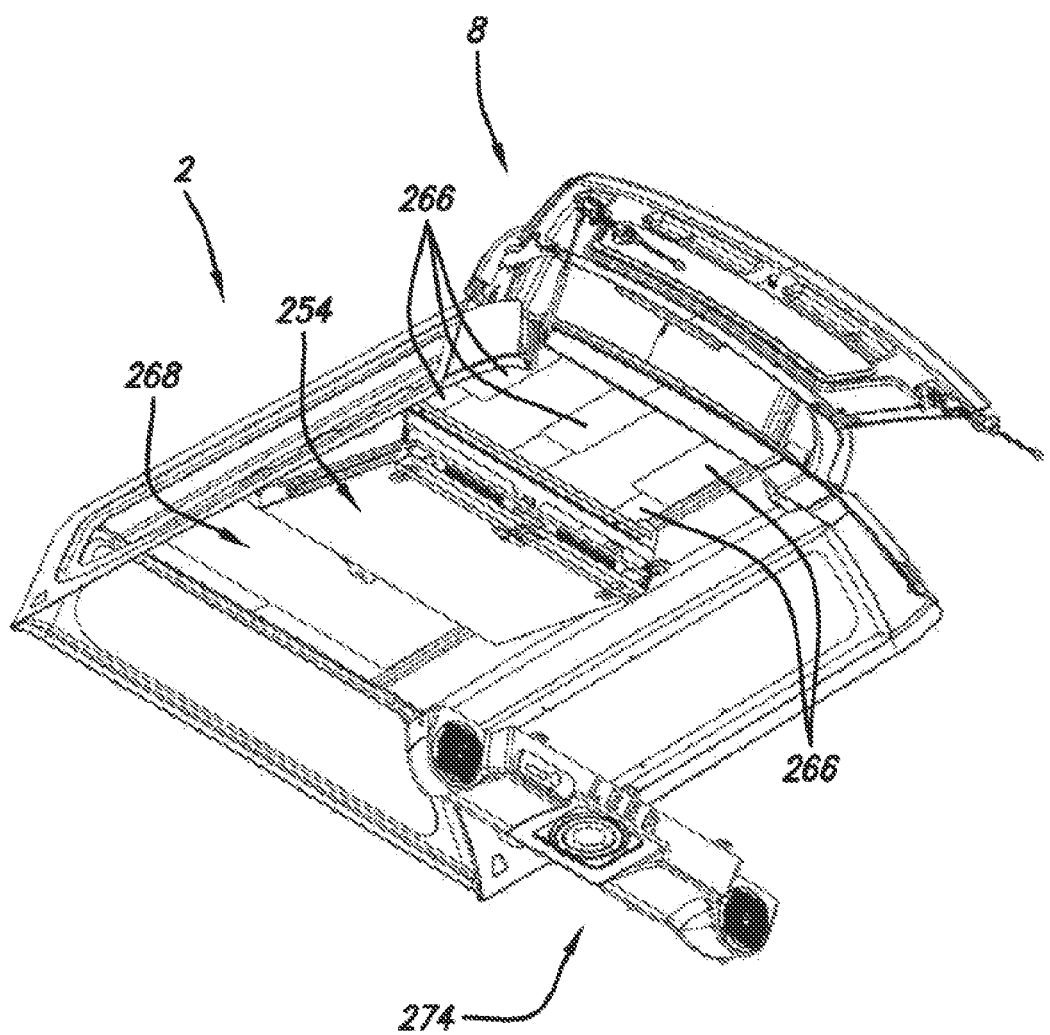
FIG. 21 is another underside view of the truck cap with the audio system spaced apart from the truck cap.

Another underside perspective view of truck cap 2 with door 8 raised to its upward open position is shown in FIG. 21. In this view, video screen mount assembly 254 is attached to various plates 266 on ceiling 268. Audio system 274, however, is shown separated from truck cap 2 so as to reveal additional plates 266 positioned towards the rear of ceiling 268. These plates provide the fastening substrate for audio system 274. Again, audio system 274, like video screen mount assembly 254, may be fastened to jack nuts embedded in plates 266 of ceiling 268 without those fasteners extending through roof panel 26 of truck cap 2.

Figure 22:
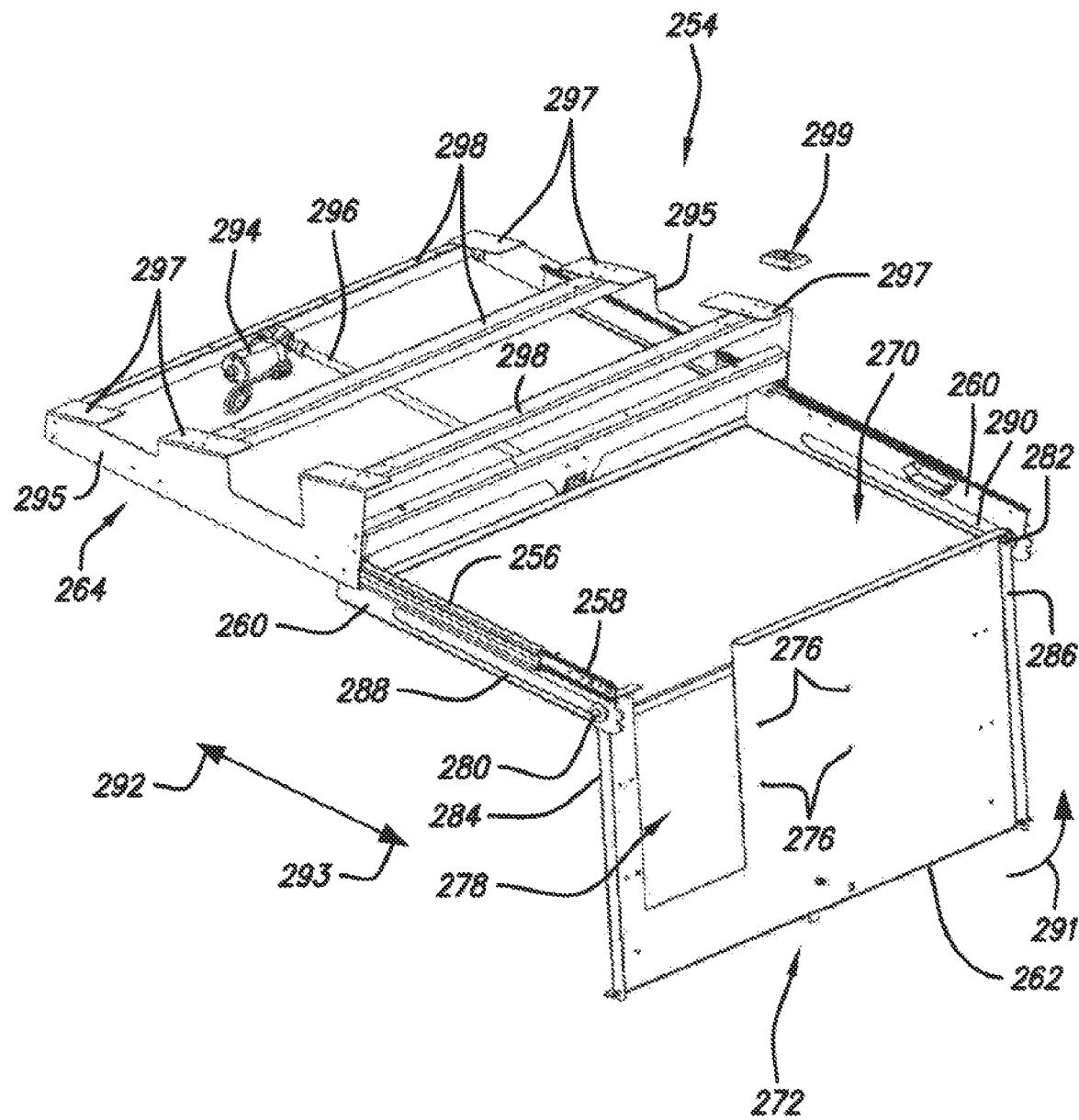
FIG. 22 is an isolated perspective view of the video screen mount assembly configured in its use position.

An isolated perspective view of video screen mount assembly 254 is shown in FIG. 22. In this view, video screen mount assembly 254 is configured in its use position. Screen mounting bracket 262 is pulled from tray 270 and pivoted downward. It is appreciated that mount holes 276 are placed in strategic locations to attach a video display to screen mounting bracket 262. A cut-out 278 in screen mounting bracket 262 offers access to various inputs and outputs that may be employed with any particular type of video display. Latch 272 releases screen mounting bracket 262 from tray 270 to move same to the use position. Pivot pins 280 and 282 are disposed through both bracket sides 284 and 286 of screen mounting bracket 262, respectively. Pivot pins 280 and 282 are also disposed through slots 288 and 290, respectively, of pivot mount brackets 260 and 261 of tray 270. As such, screen mounting bracket 262 may be pivoted in direction 291 to lift it and video display 252 level with tray 270 and then pushed in direction 292 to slide pivot pins 280 and 282 within slots 288 and 290, respectively, to place screen mounting bracket 262, along with video display 252 onto tray 270. After that, tray 270 may either be manually or mechanically moved in direction 292 as well towards the stowed position.

Also shown in FIG. 22, is motor assembly 294 that actuates a gear box to rotate a longitudinally extending worm gear 296 that extends from motor assembly 294 and attaches to rafter array 264. Worm gear 296 engages tray 270 to retract and extend it in directions 292 or 293. In the illustrative embodiment, rafter array 264 includes side brackets 295 that support telescoping slides 256 and 258. A plurality of attachment panels 297 provide an attaching structure to fasten onto plates 266 in ceiling 268. Various crossbeams 298 may be employed between side brackets 295 for purposes of adding structural stability as well. Rafter array 264 may also be an attaching structure for other components. Illustratively, a remote control 299 may be attached to truck cap 2 to actuate motor assembly 294 via wirelessly or wired connection.

Figure 23:
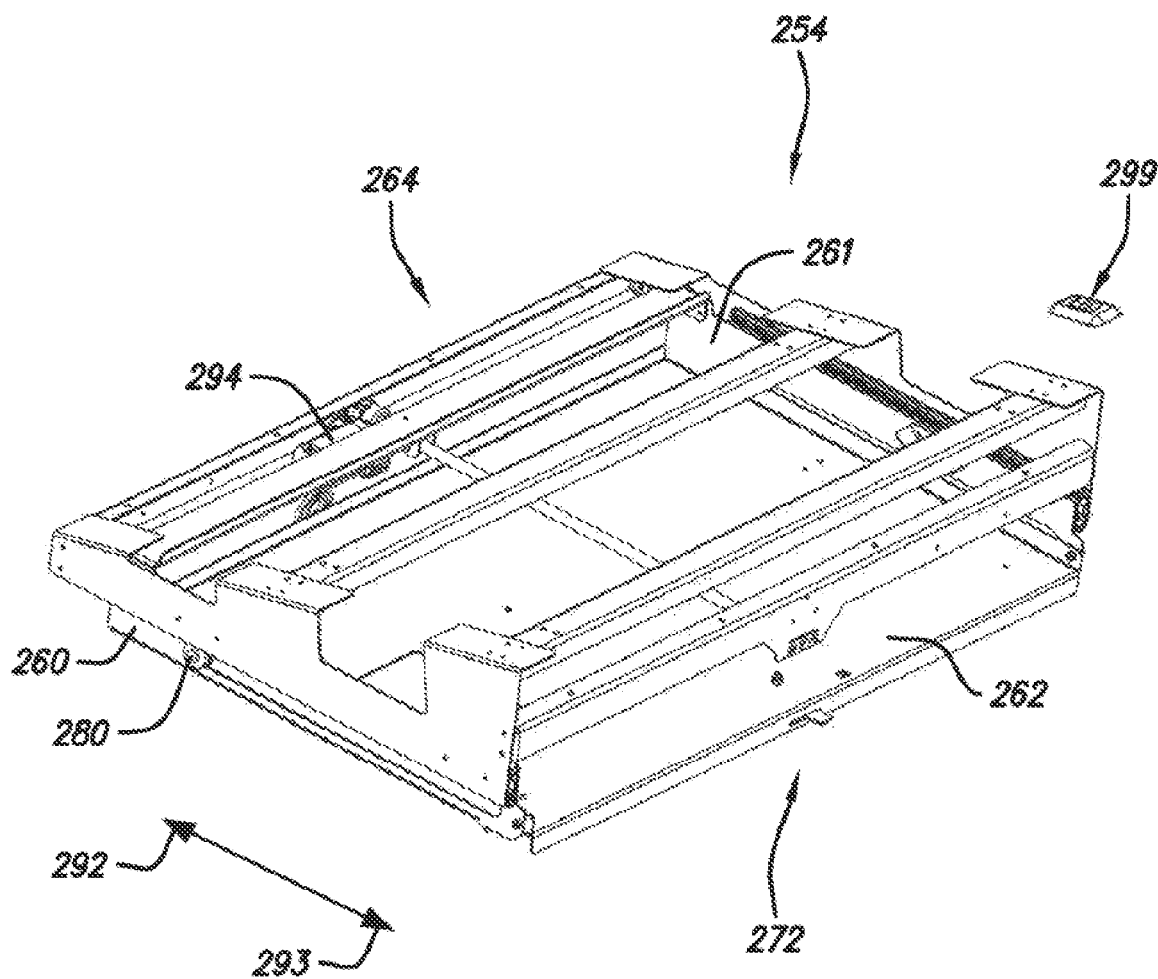
FIG. 23 is an isolated perspective view of the video screen mount assembly configured in its stowed position.

Another perspective view of video screen mount assembly 254 is shown in FIG. 23. This view depicts video screen mount assembly 254 in its stowed position. As such, pivot mounts 260 and 261 are recessed back toward rafter array 264, either manually or via motor assembly 294. Pivot pins 280 and 282 have been moved in direction 292 so screen mounting bracket 262 is supported on tray 270 for keeping video display on tray 270 when in a stowed condition. Latch 272 a spring-loaded lever that rotates to one side allowing the lever to clear a pin. Once this is cleared, screen mounting bracket 262 may slide further forward to its final location and then rotate down to the viewing position. It is further contemplated in the illustrative embodiments that power and audio/video cables (not shown) may be housed in a flexible track or like conduit. The flexible track or conduit is bendable between inputs on video display 252/audio system 274 and a power source or other audio/video connectors on the cap or truck when tray 270 is moved in either directions 292 or 293.

Figure 24:
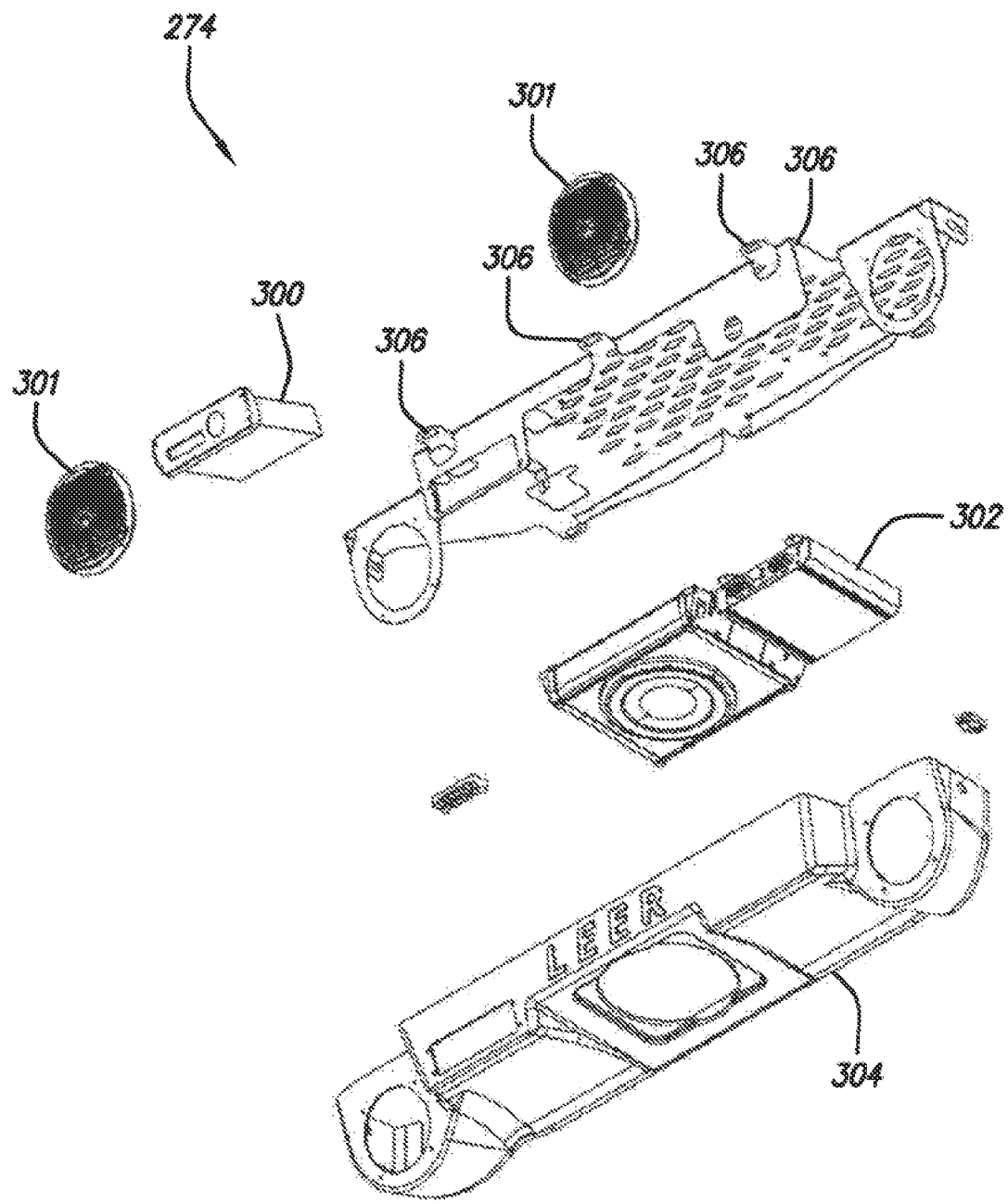
FIG. 24 is a n exploded perspective view of the audio system.

A perspective exploded view of audio system 274 is shown in FIG. 24. A bracket member 306 is configured with various attachment flanges such as attachment flanges 303 in order to fasten onto plates 266 (see, also, FIG. 21). Various components of audio system 274, such as audio player 300, audio processor 302 (with a subwoofer), and speakers 301 may be attached to bracket 306 and/or supported by audio cowl 304. In this embodiment, audio cowl 304 itself attaches to bracket 306. It is appreciated that audio system 274 may be electrically connected to video display 252 in order to produce sound for same. Nonetheless, for both video screen mount assembly to 254 and audio system 274, both may be attached to various plates 266, for purposes of securing those structures to ceiling 268, but without requiring the fasteners to extend all the way through roof panel 26 in order to support those or other structures.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this Application conflicts with the parent and priority applications, the disclosure in this Application controls.

What is claimed:

1. A cap for a cargo box of a pickup truck, wherein the cap comprises:
   a roof extending between a first downward depending sidewall and a second downward depending sidewall located opposite the first downward depending sidewall;
   wherein the roof, the first downward depending sidewall, and the second downward depending sidewall at least partially define a space therein which terminates at an opening;
   a cap door pivotally attached to the cap and selectively movable between an open position and a closed position;
   wherein the cap door covers the opening when in the closed position;
   wherein the cap door also covers an end portion of the roof, an end portion of the first downward depending sidewall and an end portion of the second downward depending sidewall when in the closed position;
   an upper shelf formed at the end portion of the roof;
   wherein the upper shelf includes a compound crown shape directed towards the first downward depending sidewall, the second downward depending sidewall, and the opening of the cap;
   a trough formed as part of the roof, the first downward depending sidewall, and the second downward depending sidewall;
   wherein the trough is positioned on the roof between the upper shelf and the opening, the first downward depending sidewall, and the second downward depending sidewall;
   wherein the trough includes a first outlet located on the first downward depending sidewall and a second outlet located on the second downward depending sidewall; and
   wherein fluid deposited on the roof is directed toward the upper shelf which directs the fluid to the trough that extends along the first downward depending sidewall and the second downward depending sidewall and to the first outlet and to the second outlet.

2. The cap of claim 1, wherein the upper shelf is located underneath the cap door when the cap door is located in the closed position.

3. The cap of claim 1, wherein the trough is located underneath the cap door when the cap door is located in the closed position.

4. The cap of claim 1, wherein the upper shelf and the trough is molded into the cap.

5. The cap of claim 1, further comprising a door seal that lines a periphery of the opening, wherein the door seal is engageable with an interior of the cap door.

6. The cap of claim 1, further comprising an upper seal located on the upper shelf.

7. The cap of claim 5, wherein the trough is located adjacent at least a portion of the door seal.

8. The cap of claim 5, wherein the door seal is located between the opening and the trough.

9. The cap of claim 1, wherein the trough is a channel feature that collects the fluid that moves from the roof towards the opening when the cap door is located in the open position.

10. A cap for a cargo box of a pickup truck, wherein the cap comprises:
    a roof extending between a first downward depending sidewall and a second downward depending sidewall located opposite the first downward depending sidewall;
    wherein the roof, the first downward depending sidewall, and the second downward depending sidewall at least partially define a space therein which terminates at an opening;
    a cap door pivotally attached to the cap and selectively movable between an open position and a closed position;
    wherein the cap door covers the opening when in the closed position;
    an upper shelf formed on a portion of the roof; and a trough located about at least a portion of the opening; wherein at least a portion of the trough is positioned between the upper shelf and the opening.

11. The cap of claim 10, wherein the upper shelf includes a compound crown shape.

12. The cap of claim 11, wherein the compound crown shape is directed towards a first downward depending sidewall, a second downward depending sidewall, and the at least a portion of the trough.

13. The cap of claim 10, wherein the cap door covers an end portion of the roof, an end portion of the first downward depending sidewall and an end portion of the second downward depending sidewall when in the closed position.

14. The cap of claim 13, wherein the upper shelf is formed at the end portion of the roof.

15. The cap of claim 10, wherein the trough is formed as part of the roof, the first downward depending sidewall, and the second downward depending sidewall.

16. The cap of claim 10, wherein the trough is positioned on the roof between the upper shelf and the opening, the first downward depending sidewall, and the second downward depending sidewall.

17. The cap of claim 10, wherein the trough includes a first outlet located on the first downward depending sidewall and a second outlet located on the second downward depending sidewall.

18. A cap for a cargo box of a pickup truck, wherein the cap comprises:
- a roof extending between a first downward depending sidewall and a second downward depending sidewall located opposite the first downward depending sidewall;
- wherein the roof, the first downward depending sidewall, and the second downward depending sidewall at least partially define a space therein which terminates at an opening;
- a cap door pivotally attached to the cap and selectively movable between an open position and a closed position;
- wherein the cap door covers the opening when in the closed position; and
- an upper shelf formed on a portion of the roof;
- wherein the upper shelf includes a compound crown shape.

19. The cap of claim 18, further comprising a trough located about the opening.

20. The cap of claim 18, wherein a trough, wherein at least a portion of the trough is positioned between the upper shelf and the opening.

* * * * *